United States Patent
Iga et al.

[11] Patent Number: 6,146,552
[45] Date of Patent: Nov. 14, 2000

[54] ZINC OXIDE CERAMICS AND METHOD FOR PRODUCING THE SAME

[75] Inventors: Atsushi Iga; Hideyuki Okinaka; Masahiro Ito, all of Osaka, Japan

[73] Assignee: Matsushita Electric Industrial Co., Ltd., Osaka, Japan

[21] Appl. No.: 09/022,609

[22] Filed: Feb. 12, 1998

Related U.S. Application Data

[62] Division of application No. 08/610,837, Mar. 5, 1996, Pat. No. 5,770,113.

[30] Foreign Application Priority Data

Mar. 6, 1995 [JP] Japan .................................. 7-045980
Jul. 13, 1995 [JP] Japan .................................. 7-177634

[51] Int. Cl.[7] .................................................. H01B 1/06
[52] U.S. Cl. .............................. 252/519.5; 252/519.51; 252/519.52; 252/519.54; 338/20; 338/21; 427/101; 427/102
[58] Field of Search ...................... 252/518, 519, 252/520, 521, 519.51, 519.52, 519.54; 106/40; 264/61, 62, 66; 338/20, 21; 427/101, 102

[56] References Cited

U.S. PATENT DOCUMENTS

| | | | |
|---|---|---|---|
| 3,950,274 | 4/1976 | May | 252/519 |
| 4,094,061 | 6/1978 | Gupta et al. | 29/612 |
| 4,111,852 | 9/1978 | Ho et al. | 252/518 |
| 4,180,483 | 12/1979 | Ho et al. | 252/518 |
| 4,297,250 | 10/1981 | Gupta et al. | 252/518 |
| 4,405,508 | 9/1983 | Eckel | 252/518 |
| 5,004,573 | 4/1991 | Oh et al. | 264/61 |
| 5,277,843 | 1/1994 | Imai et al. | 252/518 |

FOREIGN PATENT DOCUMENTS

| | | |
|---|---|---|
| 0 070 468 | 1/1983 | European Pat. Off. . |
| 0 472 259 | 2/1992 | European Pat. Off. . |
| 0 473 419 | 3/1992 | European Pat. Off. . |
| 0 497 566 | 8/1992 | European Pat. Off. . |
| 59-29402 | 2/1984 | Japan . |
| 60-28203 | 2/1985 | Japan . |
| 60-233801 | 11/1985 | Japan . |
| 2 242 065 | 9/1991 | United Kingdom . |

OTHER PUBLICATIONS

Jun. 1971, Michio Matsuoka, "Nonohmic Properties of Zinc Oxide Ceramics", *Japanese Journal of Applied Physics*, vol. 10, No. 6, pp. 736–746.

Jun. 1991, Ying–Chung Chen et al., "Grain Growth Processes in ZnO Varistors with Various Valence States of Manganese and Cobalt", *Japanese Journal of Applied Physics*, vol. 69, No. 12, pp. 8363–8367.

*Primary Examiner*—Yogendra Gupta
*Assistant Examiner*—Derrick G. Hamlin
*Attorney, Agent, or Firm*—Merchant & Gould P.C.

[57] ABSTRACT

Zinc oxide ceramics and a method for producing the same are provided wherein zinc oxide varistors for low and high voltages having excellent electric characteristics and high reliability upon DC loading and surge can be obtained in high yield by low-temperature sintering. 0.2 to 20 parts by weight of a mixed powder of bismuth oxide, titanium oxide and antimony oxide is treated in advance at a temperature of 850° C. or less. The synthetic powder thus obtained is added to 100 parts by weight of ZnO material powder to produce ceramics. By using the ceramics for a zinc oxide varistor, a zinc oxide varistor for a low or high voltage can be produced in high yield, which can be sintered at a low temperature and is excellent in electric characteristics and reliability upon DC loading and surge. Aluminum is sprayed on both sides of a sintered body so that an aluminum layer is formed. Copper is sprayed on the aluminum layer so that an electrode is formed. A lead wire is bonded to the electrode. Then, portions of the molded bodies other than the lead wire are coated and insulated so that the zinc oxide varistor can be obtained.

24 Claims, 1 Drawing Sheet

ZINC OXIDE CERAMICS AND METHOD FOR PRODUCING THE SAME

This application is a Divisional of application Ser. No. 08/610,837, filed Mar. 5, 1996, now U.S. Pat. No. 5,770,113 which application(s) are incorporated herein by reference.

FIELD OF THE INVENTION

The present invention relates to zinc oxide ceramics and a method for producing the same, and more particularly to zinc oxide ceramics and a method for producing the same for fabricating a zinc oxide varistor to be used for surge absorption in an electric circuit.

BACKGROUND OF THE INVENTION

A zinc oxide (ZnO) varistor is produced by using zinc oxide ceramics (a sintered body) which are obtained by burning zinc oxide material powder that contains zinc oxide, bismuth oxide ($Bi_2O_3$), manganese oxide ($MnO_2$) and cobalt oxide (CoO) as basic additives, and various oxides to be added for performance enhancement. It has been known that the threshold voltage of the zinc oxide varistor is almost proportional to the number of grain boundaries which are present between electrodes. More specifically, the threshold voltage rises by 3V to 4V per grain boundary. Accordingly, it is necessary to produce a sintered body having ZnO particles whose average particle size is about 4 to 40 μm in order to fabricate the zinc oxide varistor for a high voltage. It is necessary to produce a sintered body having ZnO particles whose particle size is about 40 to 200 μm for easy handling in order to produce a zinc oxide varistor for a low voltage. In order to produce the zinc oxide varistor for a high voltage, a method of adding a growth inhibitor such as antimony oxide ($Sb_2O_3$) to inhibit the growth of ZnO particles has conventionally been used. In order to produce the zinc oxide varistor for a low voltage, a method of adding a growth promotor such as titanium oxide ($TiO_2$) to promote the growth of the ZnO particles has been used.

However, a sintering temperature of 1150 to 1300° C. is required to obtain a high-performance zinc oxide varistor for high and low voltages. The high sintering temperature causes power to be consumed, bismuth oxide to be strongly scattered, and a furnace material or container to be wasted due to the strong scattering of bismuth oxide. Consequently, it has been desired to decrease the burning temperature. If burning is performed at a high temperature, the bismuth oxide or the like evaporates actively in the air. In addition, the bismuth oxide easily reacts with many materials, and readily erodes a lot of materials such as ceramics, for example, a furnace material, a container and the like. If the burning temperature is decreased by the blending of the zinc oxide varistor according to the prior art, the threshold voltage is rapidly increased so that the irregularity of a ZnO particle size is caused. Consequently, the non-linear resistance characteristic is degraded. Further, the life for power loading, pulse current loading or the like is shortened.

According to the method according to the prior art, bismuth oxide, titanium oxide, antimony oxide, chromium oxide ($Cr_2O_3$) and boron oxide ($B_2O_3$) are individually added to zinc oxide material powder. Therefore, there are a portion of the titanium oxide which reacts with zinc oxide, a portion of bismuth oxide which reacts with titanium oxide, a portion of antimony oxide which reacts with zinc oxide, a portion of bismuth oxide which reacts with antimony oxide, and the like. The boron oxide tends to form a liquid phase and coalesce at the early stage of the temperature increase so that irregularity is easily caused. As a result, the sintered body has a portion in which grain growth is not promoted and a portion in which the grain growth is promoted. In the method according to the prior art, thus, it is difficult to produce a sintered body having a regular particle size.

Furthermore, it is hard to fully control the abnormal grain growth of ZnO. Therefore, there is a problem that the electric characteristics and reliability of zinc oxide varistors obtained from a given producing lot (batch) have great variation (which occurs within the lot). In addition, there is a problem that the electric characteristics and reliability of zinc oxide varistors obtained from different producing lots have great variation (which occurs between the lots).

As described above, it is impossible to stably produce a zinc oxide varistor having excellent electric characteristics and reliability with low-temperature sintering by the method using the ceramics according to the prior art.

It is an object of the present invention to provide zinc oxide ceramics for producing, in high yield, zinc oxide varistors having reliability and electric characteristics such as non-linear resistance characteristics with low-temperature sintering.

SUMMARY OF THE INVENTION

In order to achieve the above object, a first zinc oxide ceramic of the present invention is produced by adding 0.2 to 20 parts by weight of a synthetic powder, which is prepared by heat treating a mixed powder of at least bismuth oxide, titanium oxide and antimony oxide, and 0.1 to 5.0 parts by weight of at least one of cobalt oxide and manganese oxide, to 100 parts by weight of zinc oxide as a main component. The synthetic powder means the powder prepared by heat treating and grinding the mixed powder of bismuth oxide, titanium oxide and antimony oxide.

It is preferred that the mixed powder is prepared by bismuth oxide, titanium oxide, antimony oxide and boron oxide, and that the synthetic powder is prepared by heat treating the mixed powder.

It is preferred that the mixed powder is prepared from bismuth oxide, titanium oxide, antimony oxide and chromium oxide, and that the synthetic powder is prepared by heat treating the mixed powder.

Preferably, the amount of a bismuth component to be added is 0.3 to 10.0 parts by weight for 100 parts by weight of zinc oxide by $Bi_2O_3$ conversion.

Preferably, the amount of a titanium component to be added is 0.1 to 5.0 parts by weight for 100 parts by weight of zinc oxide by $TiO_2$ conversion.

Preferably, the amount of an antimony component to be added is 0.02 to 2.5 parts by weight for 100 parts by weight of zinc oxide by $Sb_2O_3$ conversion.

It is preferred that the boron oxide is at least one of boric acid and boron trioxide.

Preferably, the synthetic powder is added to a powder material having zinc oxide as the main component and which contains 0.00062 to 0.372 part by weight of an aluminum component for 100 parts by weight of zinc oxide by $Al_2O_3$ conversion.

Preferably, a synthetic powder prepared by heat treating a mixture of bismuth oxide and boron oxide is added to a synthetic powder prepared by heat treating a mixed powder of at least bismuth oxide, titanium oxide and antimony oxide.

Preferably, a synthetic powder prepared by heat treating a mixture of bismuth oxide and chromium oxide is added to a synthetic powder prepared by heat treating a mixed powder of at least bismuth oxide, titanium oxide and antimony oxide.

Preferably, a synthetic powder prepared by heat treating a mixture of bismuth oxide and chromium oxide and a synthetic powder prepared by heat treating the mixture of bismuth oxide and boron oxide are added to a synthetic powder prepared by heat treating a mixed powder of at least titanium oxide and antimony oxide.

A second zinc oxide ceramic of the present invention is produced by adding 0.5 to 20.0 parts by weight of a synthetic powder which is prepared by heat treating and grinding a mixture of bismuth oxide, titanium oxide, antimony oxide, chromium oxide and boron oxide, and 0.1 to 5.0 parts by weight of at least one of cobalt oxide and manganese oxide to 100 parts by weight of zinc oxide powder.

It is preferred that the average particle size of the synthetic powder is 0.05 to 10 $\mu$m.

It is preferred that the manganese oxide is at least one of MnO, $Mn_2O_3$ and $MnO_2$.

It is preferred that the cobalt oxide is at least one of CoO and $Co_3O_4$.

Preferably, the amount of a bismuth component to be added is 0.3 to 18.0 parts by weight for 100 parts by weight of zinc oxide by $Bi_2O_3$ conversion.

It is preferred that the amount of a titanium component to be added is 0.03 to 2.00 parts by weight for 100 parts by weight of zinc oxide by $TiO_2$ conversion.

Preferably, the amount of an antimony component to be added is 0.005 to 1.000 part by weight for 100 parts by weight of zinc oxide by $Sb_2O_3$ conversion.

Preferably, the amount of a chromium component to be added is 0.005 to 0.500 part by weight for 100 parts by weight of zinc oxide by $Cr_2O_3$ conversion.

It is preferred that the amount of a boron component to be added is 0.002 to 1.000 part by weight for 100 parts by weight of zinc oxide by $B_2O_3$ conversion.

It is preferred that the boron oxide is at least one of boron oxide and boric acid.

It is preferred that 0.00062 to 0.37200 part by weight of an aluminum component is added for 100 parts by weight of zinc oxide by $Al_2O_3$ conversion.

A first method for producing zinc oxide ceramics according to the present invention comprises the steps of adding 0.2 to 20 parts by weight of a synthetic powder prepared by heat treating a mixed powder of at least bismuth oxide, titanium oxide and antimony oxide, and 0.1 to 5.0 parts by weight of at least one of cobalt oxide and manganese oxide to 100 parts by weight of zinc oxide, and performing sintering.

Preferably, the step of preparing synthetic powder comprises a step of heat treating a mixed powder of bismuth oxide, titanium oxide, antimony oxide and boron oxide.

Preferably, the step of preparing synthetic powder comprises a step of adding boric acid, the boric acid and bismuth oxide being blended into fine particles and heat treated.

It is preferred that the step of preparing synthetic powder comprises the steps of adding boron oxide, the boron oxide and bismuth oxide being blended into fine particles and heat treated.

Preferably, the step of preparing synthetic powder comprises steps of adding boric acid, heat treating and grinding a blended powder of bismuth oxide, titanium oxide and antimony oxide, and heat treating and grinding a blended powder of bismuth oxide and boric acid, and the step of adding the synthetic powder to zinc oxide comprises a step of adding the two kinds of powder which are prepared.

Preferably, the step of preparing synthetic powder comprises steps of adding boron oxide, heat treating and grinding a blended powder of bismuth oxide, titanium oxide and antimony oxide, and heat treating and grinding a blended powder of bismuth oxide and boron oxide, and the step of adding the synthetic powder to zinc oxide comprises a step of adding the two kinds of synthetic powder which are prepared.

It is preferred that the step of preparing synthetic powder comprises a step of heat treating a blended powder of bismuth oxide, titanium oxide, antimony oxide and chromium oxide.

Preferably, the step of preparing synthetic powder comprises steps of adding chromium oxide, heat treating and grinding a blended powder of bismuth oxide, titanium oxide and antimony oxide, and heat treating and grinding a blended powder of bismuth oxide and chromium oxide, and the step of adding the synthetic powder zinc oxide comprises a step of adding the two kinds of synthetic powder which are prepared.

It is preferred that the method further comprises a step of adding an aluminum component after the step of adding the synthetic powder to zinc oxide.

Preferably, an elongated high-density defect is formed in the micron or submicron range in parallel with the c face of zinc oxide crystalline particles of a zinc oxide polycrystalline substance in crystalline particles, and bismuth, titanium and antimony components which are sintered at a low temperature are contained in the defect.

A second method for producing zinc oxide ceramics comprises the steps of

A. heat treating and grinding a composition which contains bismuth oxide, titanium oxide, antimony oxide, chromium oxide and boron oxide to prepare a synthetic powder;

B. adding the synthetic powder to a powder material which contains zinc oxide as a first component and at least one of cobalt oxide and manganese oxide as a second component to prepare the blended powder; and C. performing sintering.

According to the above method, the second zinc oxide ceramics are obtained. The synthetic powder contains at least bismuth oxide, titanium oxide and antimony oxide which are treated by heat and ground. CoO or $Co_3O_4$ can be used for cobalt oxide. MnO, $Mn_2O_3$, or $MnO_2$ can be used for manganese oxide. Manganese carbonate ($MnCo_3$) which is changed to manganese oxide by thermal decomposition at a high temperature is also suitable. Boron trioxide or boric acid can be used for boron oxide. It is preferred that the average particle size of the synthetic powder ranges from 0.05 to 10 $\mu$m. In the step of grinding the synthetic powder, the third composition may be ground independently so as to be mixed with the first and second synthetic powder which are ground. In addition, the powders which are treated by heat may be ground together at the same time.

Preferably, the method for preparing synthetic powder comprises, in place of the step A, steps of heat treating a first composition which contains bismuth oxide, titanium oxide, antimony oxide and boron oxide to prepare a first synthetic powder, heat treating a second composition which contains bismuth oxide and chromium oxide to prepare a second synthetic powder, and grinding the first and second synthetic powders.

Preferably, the method for preparing synthetic powder comprises, in place of the step A, steps of heat treating a first composition which contains bismuth oxide, titanium oxide and antimony oxide to prepare a first synthetic powder, heat treating a second composition which contains bismuth oxide, chromium oxide and boron oxide to prepare a second synthetic powder, and grinding the first and second synthetic powders.

Preferably, a third composition which contains bismuth oxide and boron oxide is heat treated and ground to prepare a third synthetic powder, and the first to third synthetic powders are mixed and added to the powder material so that the blended powder is adjusted.

Preferably, the method for producing zinc oxide ceramics further comprises a step of adding 0.00062 to 0.37200 part by weight of an aluminum component for 100 parts by weight of zinc oxide by $Al_2O_3$ conversion.

It is preferred that the second composition contains 1 part by mol or more of chromium oxide for 1 part by mol of bismuth oxide.

It is preferred that the molar ratio of bismuth oxide to boron oxide of the third composition is 80:20 to 20:80.

It is preferred that the boron oxide is at least one of boron trioxide and boric acid.

Preferably, the heat treating temperature is 450 to 800° C.

Preferably, the heat treating time is 10 mins. to 10 hrs.

Preferably, the step of forming the blended powder comprises a step of adding the synthetic powder to the powder material and then grinding the blended powder.

According to the first ceramics and the method for producing the same according to the present invention, the synthetic powder prepared in advance by heat treating the blended powder of bismuth oxide, titanium oxide and antimony oxide is used to produce the zinc oxide ceramics so that the growth of ZnO particles can be promoted uniformly even if the burning temperature is lowered to about 850° C. By using the synthetic powder having proper compositions, ZnO particles having an average particle size which is optionally selected can be obtained within the wide range with a small particle size distribution. More specifically, it is possible to produce a zinc oxide varistor having excellent electric characteristics and reliability in the high yield. In addition, low-temperature sintering can be performed so that it is possible to use Ag electrodes in place of Pt electrodes according to the prior art.

According to the second ceramics and the method for producing the same of present invention, the use of the synthetic powder prepared by treating the mixture or a part of bismuth oxide, titanium oxide, antimony oxide, chromium oxide and boron oxide at a temperature of 450 to 800° C. provides ZnO particles whose growth can be promoted uniformly even if the temperature is lowered to 720 to 1100° C. Accordingly, a sintered body having ZnO particles whose average particle size is great with a small distribution, and a sintered body of ZnO particles whose average particle size is small with a small distribution, can be obtained depending on composition. Thus, the zinc oxide varistor having excellent electric characteristics and reliability can be produced in high yield. In addition, low-temperature sintering can be performed so that it is possible to use Ag electrodes in place of Pt electrodes according to the prior art. Furthermore, power consumption can be reduced, and a furnace material and a container are seldom wasted. Consequently, energy and resources can be saved considerably.

DETAILED DESCRIPTION OF THE INVENTION

Figure 1:
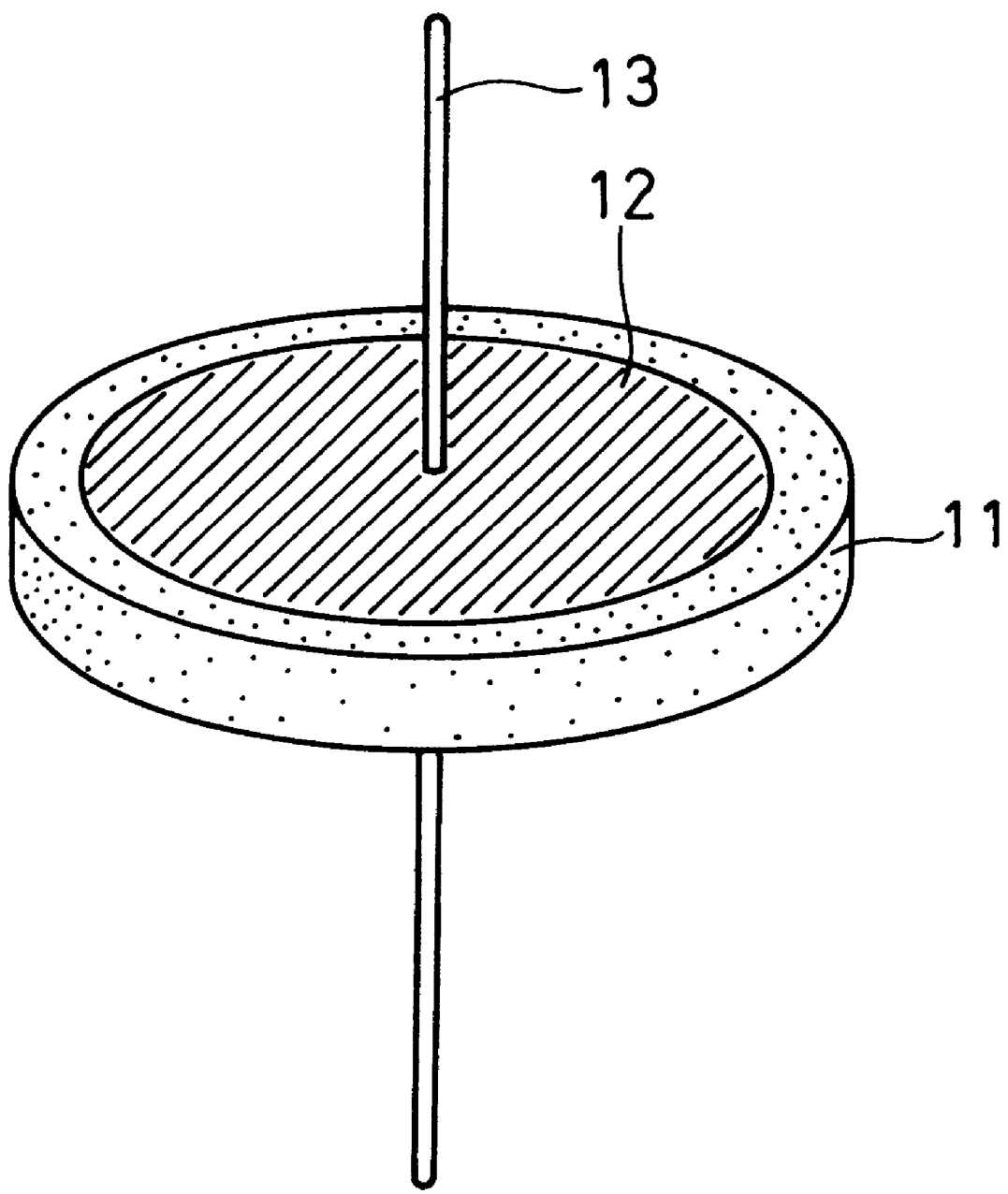
FIG. 1 is a schematically perspective view showing a zinc oxide varistor produced by zinc oxide ceramics according to an embodiment of the present invention.

According to first zinc oxide ceramics according to the present invention, 0.2 to 20 parts by weight of synthetic powder, 0.1 to 5.0 parts by weight of at least one of cobalt oxide and manganese oxide are added to 100 parts by weight of a powder material including zinc oxide as a main component. The synthetic powder is prepared by treating the mixed powder of bismuth oxide, titanium oxide and antimony oxide with heat. Thus, bismuth oxide, titanium oxide, antimony oxide and the like are added into the zinc oxide based ceramic composition for a ZnO varistor. Generally, titanium oxide reacts with zinc oxide to form a spinel. Consequently, the effect of promoting the grain growth of zinc oxide would not be obtained. However, since titanium oxide reacts with bismuth oxide, the grain growth of zinc oxide is promoted by a reaction product. Antimony oxide generally reacts with zinc oxide to form a spinel so that the effect of inhibiting the grain growth of zinc oxide would be reduced. However, antimony oxide reacts with bismuth oxide so that the grain growth of zinc oxide is inhibited by the reaction product.

The zinc oxide ceramic is obtained in the following manner. More specifically, the mixed powder which contains at least bismuth oxide, titanium oxide and antimony oxide is treated with heat so that a synthetic powder is prepared. The synthetic powder is added to zinc oxide. Consequently, the grain growth of the zinc oxide varistor can be controlled even if low-temperature sintering is performed. Thus, it is possible to obtain zinc oxide having constant electric characteristics and high reliability and quality.

If 0.2 part by weight or less of the synthetic powder is used, the threshold voltage of the zinc oxide varistor becomes low. In addition, the threshold voltage is low for long-time DC loading. Further, the absolute value of the rate of change $\Delta V_{1mA}/\Delta_{1mA}$ of the threshold voltage $V_{1mA}$ for a surge is great. Thus, the results of measurement of any electric characteristic may have a great variation. If the amount of the synthetic powder to be added exceeds 20 parts by weight, samples stick together so that the zinc oxide varistor is hard to produce. Consequently, the electric characteristics cannot be measured. Preferably, 0.5 to 20 parts by weight of the synthetic powder which is prepared by heat treating the mixed powder of bismuth oxide, titanium oxide and antimony oxide is added to 100 parts by weight of ZnO powder.

According to the preferred example in which the mixed powder that contains bismuth oxide, titanium oxide, antimony oxide and boron oxide is treated with heat to prepare the synthetic powder, the following effects can be obtained in addition to the above functions. More specifically, the grain growth can be promoted by the operation of boron components, low-temperature sintering can be performed more stably, and the grain growth of the zinc oxide can be controlled during the low-temperature sintering so that the zinc oxide varistor having constant electric characteristics and high reliability and quality can obtained.

According to the preferred example in which the mixed powder that contains bismuth oxide, titanium oxide, antimony oxide and chromium oxide is heat treated to prepare the synthetic powder, abnormal grain growth can be controlled by the contained chromium components and current-voltage characteristics can be stabilized so that the zinc oxide varistor having constant electric characteristics can be obtained.

According to the preferred example in which the amount of bismuth components to be added is 0.3 to 10.0 parts by weight for 100 parts by weight of the zinc oxide by $Bi_2O_3$ conversion, the following effects can be obtained in addition to the above functions. More specifically, the liquid phase sintering of the zinc oxide varistor can be promoted and the defective density of a grain interface of the zinc oxide can be increased. If the amount of the bismuth components to be added is less than 0.2 part by weight for 100 parts by weight of zinc oxide by $Bi_2O_3$ conversion, the effects cannot be obtained by the addition of the bismuth components and the threshold voltage of the zinc oxide varistor is low. In addition, the absolute value is great for the rate of change in long-time DC loading and the rate of surge change. Consequently, good electric characteristics cannot be obtained. If the amount of $Bi_2O_3$ to be added exceeds 15 parts by weight, the zinc oxide varistor is deformed or fused during sintering so that dimensional precision becomes low and production becomes poor. For this reason, it is preferred that the amount of the bismuth components to be added ranges from 0.3 to 10.0 parts by weight by $Bi_2O_3$.

According to the preferred example in which the amount of titanium components to be added is 0.1 to 5.0 parts by weight for 100 parts by weight of zinc oxide by $TiO_2$ conversion, the grain growth of zinc oxide can be promoted and the zinc oxide varistor suitable for a low voltage can be obtained in addition to the above functions. If the amount of the titanium components to be added is less than 0.1 part by weight for 100 parts by weight of zinc oxide by $TiO_2$ conversion, the effects cannot fully be obtained by the addition of the components, the electric characteristics of the zinc oxide varistor cannot be improved and the absolute values of the rate of change in surge and the rate of change in DC loading are great. If the amount of the titanium components to be added exceeds 7 parts by weight by $TiO_2$ conversion, the threshold voltage of the zinc oxide varistor becomes low. Consequently, it is preferred that the amount of the titanium components to be added is 0.1 to 5.0 parts by weight by $TiO_2$ conversion.

According to the preferred example in which the amount of antimony components to be added is 0.02 to 2.5 parts by weight for 100 parts by weight of zinc oxide by $Sb_2O_3$ conversion, the following effects can be obtained in addition to the above functions. More specifically, the grain growth of zinc oxide can be adjusted easily and the zinc oxide varistor suitable for a predetermined voltage can be obtained readily. If the amount of the antimony components to be added is less than 0.02 part by weight for 100 parts by weight of zinc oxide by $Sb_2O_3$ conversion, the effects cannot fully be obtained by the addition of the components, the electric characteristics of the zinc oxide varistor cannot be improved and the absolute values of the change in surge and the rate of change in DC loading are great. If the amount of the antimony components to be added exceeds 2.5 parts by weight by $Sb_2O_3$ conversion, the threshold voltage of the zinc oxide varistor can be increased. Consequently, the electric characteristics have variation. Therefore, it is preferred that the amount of the antimony components to be added is 0.02 to 2.5 parts by weight by $Sb_2O_3$ conversion.

According to the preferred example in which the boron oxide is boric acid, the boron components can be added uniformly and the sintering of the entire body can be started. If boron oxide is independently added, a liquid phase is generated at a very low temperature so that addition cannot be performed uniformly.

According to the preferred example in which the boron oxide is boric oxide, the boron components can be added uniformly and low-temperature sintering can be performed in the same as the foregoing.

According to the preferred example in which the powder material whose main component is zinc oxide, to which the synthetic powder is added, contains 0.00062 to 0.372 parts by weight of aluminum components by aluminum oxide conversion for 100 parts by weight of zinc oxide, the following effects can be obtained in addition to the above functions. More specifically, the aluminum components which are added are melted in ZnO particles, and serve as a donor of a semiconductor so that the electric resistance of ZnO can be lowered. If the amount of the aluminum components to be added is less than 0.00062 part by weight for 100 parts by weight of zinc oxide by aluminum oxide conversion, the electric resistance of the zinc oxide varistor cannot be lowered. If the amount of the aluminum components to be added exceeds 0.372 part by weight for 100 parts by weight of zinc oxide by aluminum oxide conversion, the electric resistance of the zinc oxide varistor is lowered too much and other electric characteristics might become poor.

A first method for producing zinc oxide ceramics according to the present invention comprises the steps of heat treating the blended powder of at least bismuth oxide, titanium oxide and antimony oxide to prepare synthetic powder, and of adding the synthetic powder to a powder material whose main component is zinc oxide. According to the present invention, the blended powder of bismuth oxide, titanium oxide and antimony oxide is treated by heat at a temperature of 850° C. or less in advance, and the prepared synthetic powder is added to zinc oxide material powder so as to correspond to the required electric characteristics so that a sintered body was produced. Consequently, the growth of ZnO particles can be promoted uniformly with low-temperature sintering when producing a zinc oxide varistor. As a result, it is possible to produce a zinc oxide varistor having constant electric characteristics and high reliability by sintering at a 1100° C. or less as compared with a sintering temperature of 1150 to 1300° C. according to the prior art.

According to the preferred example in which the blended powder of bismuth oxide, titanium oxide, antimony oxide and boron oxide is heat treated so that the synthetic powder is prepared, the following effects can be obtained in addition to the above functions. More specifically, boron oxide causes additives to diffuse more quickly by forming a liquid phase so that the uniformity of grain boundary characteristics can be promoted. The uniform quality of the zinc oxide varistor can be obtained in the low-temperature sintering.

According to the preferred example in which the blended powder of bismuth oxide and boron oxide is heat treated to prepare synthetic powder and boron components are added, the synthetic powder which contains the boron oxide can be prepared easily and the uniformity of grain boundary characteristics can be promoted readily so that the zinc oxide varistor can be sintered easily at a low temperature.

According to the preferred example, the blended powder of bismuth oxide and boron oxide is treated by heat to prepare synthetic powder and boron components are added, the following effects can be obtained in addition to the above functions. More specifically, the synthetic powder can be prepared easily, and the uniform quality can be obtained by boron oxide when sintering the zinc oxide varistor at a low temperature.

According to the preferred example in which the steps of preparing synthetic powder comprises the steps of heat treating and grinding the blended powder of bismuth oxide, titanium oxide and antimony oxide, and heat treating and grinding the blended powder of bismuth oxide and boron oxide, and the step of adding the synthetic powder to the powder material whose main component is zinc oxide comprises the step of adding the two kinds of synthetic powder which were prepared, the following effects can be obtained similarly to the above functions. More specifically, the diffusion of additives can be adjusted by boron, the uniformity of grain boundary characteristics can be promoted, and the uniformity of quality can be enhanced when sintering the zinc oxide varistor at a low temperature.

According to the preferred example in which the blended powder of bismuth oxide, titanium oxide, antimony oxide and chromium oxide is treated by heat to prepare the synthetic powder, chromium can be added in the trivalent state or as toxic chromium (VI).

According to the preferred example in which the step of preparing synthetic powder comprises the step of heat treating the mixture powder of bismuth oxide, titanium oxide, antimony oxide and chromium oxide, chromium (VI) can be added and toxic chromium (VI) can be prevented from being generated.

According to the preferred example in which the step of preparing synthetic powder comprises the steps of heat treating and grinding the mixed powder of bismuth oxide, titanium oxide and antimony oxide and of heat treating and grinding the mixed powder of bismuth oxide and chromium oxide, and the step of adding the synthetic powder to the powder material whose main component is zinc oxide comprises the step of adding the two kinds of synthetic powder thus prepared, chromium oxide can be added more uniformly and the above functions can be obtained more easily.

According to the preferred example comprising the steps of adding synthetic powder to the powder material whose main component is zinc oxide and then adding an aluminum component, the added aluminum component is dissolved in ZnO particles without damaging the control of grain growth and acts as the donor of a semiconductor so that the electric resistance of ZnO can be lowered.

According to the preferred example in which an elongated high-density defect is formed in the micron or submicron range in parallel with the c face of zinc oxide crystalline particles of a zinc oxide polycrystalline substance in the crystalline particles, and bismuth, titanium and antimony components which are sintered at a low temperature are contained, the fine defects are formed in parallel with the c face of ZnO fine crystals to activate volume diffusion so that the grain growth of zinc oxide can be promoted. In such an example that bismuth oxide, titanium oxide, antimony oxide and the like are added, the volume diffusion can be activated at a low temperature and low-temperature sintering can be performed. Even if the low-temperature sintering is performed, a zinc oxide varistor having constant electric characteristics and high reliability can be obtained.

The zinc oxide ceramics of the present invention are compressed and molded. A molded body thus obtained is sintered at a temperature of 850 to 1100° C. Then, an electrode is formed on the molded body so that the varistor is formed.

Accordingly, the synthetic powder prepared by heat treating the mixed powder of bismuth oxide, titanium oxide and antimony oxide in advance at a temperature of 850° C. or less is added to the zinc oxide powder material so as to provide compositions corresponding to required electric characteristics so that the desired sintered body is produced. Consequently, the growth of ZnO particles can be promoted uniformly at a low temperature when sintering. As a result, it is possible to produce a zinc oxide varistor having constant electric characteristics and high reliability by sintering at a lower temperature than the temperature of 1100° C. or less according to the prior art.

The mixed powder of bismuth oxide, titanium oxide and antimony oxide is treated at a temperature of 850° C. or less in an oxidizing atmosphere, i.e., in the air. The reason is that low-temperature sintering is meaningless if the temperature exceeds 850° C. and grinding is hard to perform. In addition, the grain growth of zinc oxide cannot be controlled by heat treatment if the temperature is less than 450° C. Accordingly, 450 to 850° C. is preferred in order to obtain the effects of heat treatment, and 500 to 650° C. is preferred in order to promote the reaction of heat treatment, obtain the effects of heat treatment and have no damage.

According to the second zinc oxide ceramics of the present invention, 0.5 to 20.0 parts by weight of synthetic powder prepared by heat treating and grinding the mixture of bismuth oxide, titanium oxide, antimony oxide, chromium oxide and boron oxide and 0.1 to 5.0 parts by weight of at least one of cobalt oxide and manganese oxide are added to 100 parts by of zinc oxide powder. Consequently, it is possible to produce the ceramics which can be sintered at a lower temperature than the temperature of 1100° C. or less according to the prior art. In the case of 0.2 part by weight or less of synthetic powder for 100 parts by weight of zinc oxide powder, the threshold voltage of the zinc oxide varistor is low. Furthermore, the threshold voltage of the zinc oxide varistor is low for long-time DC loading, and the absolute value of the range of change in threshold voltage is great for surges. In addition, any electric characteristic has great variation. When the synthetic powder exceeds 20 parts by weight, samples stick together so that it is hard to produce the zinc oxide varistor. In order to obtain a sintered body having a uniform particle size, it is preferred that the average particle size of the synthetic powder ranges from 0.05 to 10 $\mu$m. Preferably, the average particle size of the powder material which contains zinc oxide powder and the like is 0.05 to 5.0 $\mu$m.

When the composition ratio of bismuth oxide, titanium oxide, antimony oxide, chromium oxide and boron oxide is changed, sintered bodies having a uniformly great particle size, having a uniformly small particle size and having great and small particle sizes can be obtained. In this respect, the preferable range of each component to be added is as follows. The amount of a bismuth component is 0.3 to 18.0 parts by weight for 100 parts by weight of zinc oxide by $Bi_2O_3$ conversion. The amount of a titanium component is 0.03 to 2.00 parts by weight for 100 parts by weight of zinc oxide by $TiO_2$ conversion. The amount of an antimony component is 0.005 to 1.000 part by weight for 100 parts by weight of zinc oxide by $Sb_2O_3$ conversion. The amount of a chromium component is 0.005 to 0.500 part by weight for 100 parts by weight of zinc oxide by $Cr_2O_3$ conversion. The amount of a boron component is 0.002 to 1.000 part by weight for 100 parts by weight of zinc oxide by $B_2O_3$ conversion. When the synthetic powder is 100, the composition ratio of each component which can be used is expressed by mol % as follows. $Bi_2O_3$:20 to 99 mol %, $TiO_2$:0.05 to 80 mol %, $Sb_2O_3$:0.5 to 50 mol %, $Cr_2O_3$; 1.0 to 20 mol %, $B_2O_3$:1.0 to 20 mol %.

According to the preferred example in which 0.00062 to 0.37200 part by weight of an aluminum component is added to 100 parts by weight of zinc oxide powder by $Al_2O_3$ conversion, the added aluminum component is dissolved in ZnO particles and acts as the donor of a semiconductor. Consequently, the electric resistance of ZnO can be lowered without damaging other electric characteristics.

According to the method for producing second zinc oxide ceramics of the present invention, the synthetic powder is prepared by heat treating and grinding compositions which contain bismuth oxide, titanium oxide, antimony oxide, chromium oxide and boron oxide, and is added to the powder material which contains zinc oxide as a first component and at least one of cobalt oxide and manganese oxide as a second component so that the blended powder is prepared. Consequently, the growth of ZnO particles can be promoted uniformly at a low temperature. In addition, a sintered body having a uniform particle size can be produced.

A first composition which contains bismuth oxide, titanium oxide, antimony oxide and boron oxide is treated by heat to prepare a first synthetic powder, and a second composition which contains bismuth oxide and chromium oxide is treated by heat to prepare a second synthetic powder. The first and second synthetic powders are ground and then added to a powder material which contains zinc oxide as a first component and at least one of cobalt oxide and manganese oxide as a second component, so that the blended powder is adjusted. Consequently, the growth of ZnO particles can be promoted uniformly at a low temperature and a sintered body having a uniform particle size can be produced.

A first composition which contains bismuth oxide, titanium oxide and antimony oxide is heat treated to prepare a first synthetic powder, and a second composition which contains bismuth oxide, chromium oxide and boron oxide is heat treated to prepare a second synthetic powder. The first and second synthetic powders are ground and then added to material powder which contains zinc oxide as a first component and at least one of cobalt oxide and manganese oxide as a second component, so that the blended powder is adjusted. Consequently, the growth of ZnO particles can be promoted uniformly at a low temperature and a sintered body having a uniform particle size can be produced.

According to the preferred example of the present invention in which a third composition which contains bismuth oxide and boron oxide is heat treated and ground to prepare a third synthetic powder, and the first and third synthetic powders are mixed and added to the powder material to adjust the blended powder, the growth of ZnO particles can be promoted uniformly at a low temperature and a sintered body having a uniform particle size can be produced. If the heat treating temperature is less than 450° C., it is hard to control the grain growth of zinc oxide. If the heat treating temperature exceeds 800° C., grinding is hard to perform.

According to the preferred example of the present invention in which the step of adjusting the blended powder comprises the step of adding 0.00062 to 0.37200 part by weight of an aluminum component to 100 parts by weight of zinc oxide in the powder material by $Al_2O_3$ conversion, the aluminum component is dissolved in ZnO particles and acts as the donor of a semiconductor. Consequently, the electric resistance of ZnO can be lowered without damaging other electric characteristics.

According to the preferred example of the present invention in which the second composition contains 1 part by mol or more of chromium oxide for 1 part by mol of bismuth oxide, it is possible to prevent the generation of toxic chromium (VI) that may be easily caused by the synthesis in which the amount of $Bi_2O_3$ is greater than that of $Cr_2O_3$. If the second composition contains only bismuth oxide and chromium oxide, the preferable molar ratio is 25:75 to 50:50.

According to the preferred example of the present invention in which the molar ratio of bismuth oxide to boron oxide as a third composition is 80:20 to 20:80, the sintering temperature can be lowered while providing a uniform particle size.

According to the preferred example of the present invention in which the step of adjusting the blended powder comprises the step of adding synthetic powder to the powder material and then grinding the blended powder, a sintered body having a uniform particle size can be produced.

The second zinc oxide ceramics according to the present invention are compressed and molded to a predetermined shape. A molded body thus obtained is sintered at a temperature of 720 to 1100° C. so that a sintered body can be obtained. By using the sintered body, a zinc oxide varistor having excellent reliability and electric characteristics such as nonlinear resistance properties are obtained in high yield.

While MgO and NiO are added in the method according to the prior art, these additives which are dissolved in ZnO can be added to obtain a varistor having good characteristics.

EMBODIMENTS

Preferred embodiments of the present invention will be described in detail with reference to the tables and drawings.

EXAMPLE 1

Bismuth oxide ($Bi_2O_3$) powder, titanium oxide ($TiO_2$) powder, and antimony oxide ($Sb_2O_3$) (whose particles pass through 200-, 325- and 200-mesh screens respectively) were blended at a weight ratio of 88:10:2. The blended powder was heated at a temperature of 600° C. for 5 hrs. in the air, and then ground fine for 12 to 18 hrs. by means of stabilizing zirconia balls in a monomalon pot. Consequently, a synthetic power (whose particles pass through the 325-mesh screen) was obtained. The synthetic powder which is prepared from bismuth oxide, titanium oxide and antimony oxide is called bismuth oxide/titanium oxide/antimony oxide synthetic powder. It is not very difficult to grind the blended powder which has been heat treated at the temperature of 600° C. in order to obtain the synthetic powder in a manner similar to the process of grinding each powder.

Zinc oxide powder (the average particle size of 0.3 μm), bismuth oxide/titanium oxide/antimony oxide synthetic powder, cobalt oxide (CoO) powder (whose particles pass through a 325-mesh screen), manganese oxide ($MnO_2$) powder (whose particles pass through a 200-mesh screen) were blended at a weight ratio of 100:0.2 to 20.0:0.954:0.414 while changing the amount of the bismuth oxide/titanium oxide/antimony oxide synthetic powder. The blended powder was mixed for 12 to 18 hrs. and ground so as to pass through the 325-mesh screen by the wet method (with stabilizing zirconia balls in the monomalon pot).

The ground powder was dried, and compressed and molded into a disk. The temperature of the molded product thus obtained is raised at a rate of 50° C./hr in the air, held for 13 hrs. at a temperature of 950° C. and cooled at a temperature of 50° C./hr. Consequently, a sintered product was obtained. The sintered product had a thickness of 1.2 mm and a diameter of 14 mm. A zinc oxide varistor shown in FIG. 1 was prepared from the zinc oxide ceramics. More specifically, aluminum is sprayed on the both sides of a sintered product 11 to form an aluminum layer (not shown). Then, copper was sprayed on the aluminum layer to form an electrode 12. A lead wire 13 was bonded to the electrode 12 by a solder. Then, the portions of the molded product other than the lead wire 13 are coated and insulated. Consequently, a zinc oxide varistor was obtained.

The electric characteristics of the zinc oxide varistor thus obtained are evaluated. As initial electric characteristics, $V_{1mA}$/mm (a voltage/1 mm thickness between terminals obtained when a current of 1 mA flows) and a nonlinear resistance index $_{0.1mA}\alpha_{1mA}$ (a value obtained by $V_{1mA}$ and $V_{0.1mA}$) were measured.

The reliability for long-time DC loading was evaluated in the following manner. More specifically, DC loading of 0.2 W was applied for 500 hrs. in the high-temperature atmosphere of 80° C. and the rate of change $\Delta V_{1mA}/V_{1mA}$ in varistor threshold voltage $V_{1mA}$ (the rate of change in DC loading) was measured. Further, the reliability for surge was evaluated. More specifically, a pulse of 8×20 μsec, 0.5 kA was applied twice and the rate of change $\Delta V_{1mA}/V_{1mA}$ in the varistor threshold voltage $V_{1mA}$ (the rate of change in surge) was obtained.

Table 1 shows the composition of samples used for manufacturing a varistor, and Table 2 shows the results of the evaluation of electric characteristics corresponding to the composition shown in Table 1. The values indicative of the results of evaluation of the electric characteristics are maximum and minimum values within several lots.

TABLE 1

| Sample No. | ZnO (part by weight) | $Bi_2O_3$—$TiO_2$—$Sb_2O_3$ Synthetic powder (*) (part by weight) | CoO (part by weight) | $MnO_2$ (part by weight) |
| --- | --- | --- | --- | --- |
| 101 | 100.0 | 0.2 | 0.954 | 0.414 |
| 102 | 100.0 | 0.5 | 0.954 | 0.414 |
| 103 | 100.0 | 0.7 | 0.954 | 0.414 |
| 104 | 100.0 | 1.0 | 0.954 | 0.414 |
| 105 | 100.0 | 2.0 | 0.954 | 0.414 |
| 106 | 100.0 | 5.0 | 0.954 | 0.414 |
| 107 | 100.0 | 10.0 | 0.954 | 0.414 |
| 108 | 100.0 | 15.0 | 0.954 | 0.414 |
| 109 | 100.0 | 20.0 | 0.954 | 0.414 |

(*) Heat treatment of $Bi_2O_3$:$TiO_2$:$Sb_2O_3$ = 88:10:2 (weight ratio)

TABLE 2

| Sample No. | $V_{1mA/mm}$ (V) | $_{0.1mA}\alpha_{1mA}$ | Rate of change in DC loading $\Delta V_{1mA}/V_{1mA}$(%) | Rate of change in surge $\Delta V_{1mA}/V_{1mA}$(%) |
| --- | --- | --- | --- | --- |
| 101 | 5~12 | 10~14 | −25~−15 | −35~−30 |
| 102 | 21~25 | 15~24 | −4~−2 | −4~−1 |
| 103 | 22~26 | 30~33 | −1~+1 | −2~+1 |
| 104 | 24~28 | 30~35 | −1~+1 | −3~+1 |
| 105 | 25~29 | 31~34 | −1~0 | −2~+2 |
| 106 | 26~29 | 28~34 | −1~0 | −2~+1 |
| 107 | 25~27 | 29~35 | −3~−2 | −1~+2 |
| 108 | 26~29 | 30~34 | −3~−1 | −2~+1 |
| 109 | — | — | — | — |

As is apparent from Tables 1 and 2, the zinc oxide varistor produced from the zinc oxide ceramics which were obtained by the method according to the present invention had a low threshold voltage and the absolute value of the rate of change $\Delta V_{1mA}/V_{1mA}$ of the threshold voltage $V_{1mA}$ was 5% or less for long-time DC loading and surge so that great reliability could be obtained, except for sample No.101 having 0.2 part by weight of the synthetic powder of bismuth oxide, titanium oxide and antimony oxide. As shown in Table 2, the electric characteristics within the lots had small variations.

When the zinc oxide varistor was produced from the ceramics of this example, the changes in electric characteristics between lots was small, similarly to the electric characteristics within the lots so that product yield was considerably enhanced, which is not shown in Table 2. When the amount of $Bi_2O_3$-TiO -$Sb_2O_3$ synthetic powder to be added exceeded 20 parts by weight for 100 parts by weight of ZnO powder, samples stuck together so that measurement could not be performed (sample No.109). Accordingly, it is preferred that the amount of $Bi_2O_3$-$TiO_2$-$Sb_2O_3$ synthetic powder to be added is 0.5 to 20 parts by weight for 100 parts by weight of ZnO powder.

COMPARATIVE EXAMPLE 1

In the same manner as in Example 1, three kinds of zinc oxide varistors using a sintered body were produced by the method in which the mixed powder of bismuth oxide powder, titanium oxide fine powder and antimony oxide powder is not synthesized according to the prior art.

Zinc oxide (ZnO) powder, bismuth oxide ($Bi_2O_3$) powder, titanium oxide ($TiO_2$) fine powder, antimony oxide ($Sb_2O_3$) powder, cobalt oxide (CoO) powder and manganese oxide ($MnO_2$) powder were blended at a weight ratio of 100:0.88 0.10 0.02:0.954:0.414 (sample No.112), 100:1.76 0.20:0.04 0.954:0.414 (sample No.112), and 100:4.4:0.5:0.1:0.954:0.414 (sample No.113). The blended powder was mixed and ground by the wet method.

In order to evaluate the electric characteristics, the zinc oxide varistor was produced in the same manner as in Example 1. The ground powder thus obtained was dried, and compressed and molded into a disk. Similarly to Example 1, the temperature of the molded body was raised at a speed of 50° C./hr in the air. Then, the molded body was held for 13 hrs. at a temperature of 950° C. Thereafter, the temperature of the molded body was lowered at a speed of 50° C./hr so that a sintered body was obtained. The sintered body had a thickness of 1.2 mm and a diameter of 14 mm.

In the same manner as in Example 1, a zinc oxide varistor was produced. The electric characteristics of the zinc oxide varistor are evaluated. Table 3 shows sample compositions, and Table 4 shows the results of evaluation of the electric characteristics.

TABLE 3

| Sample No. | ZnO (part by weight) | $Bi_2O_3$ (part by weight) | $TiO_2$ (part by weight) | $Sb_2O_3$ (part by weight) | CoO (part by weight) | $MnO_2$ (part by weight) |
| --- | --- | --- | --- | --- | --- | --- |
| 111 | 100.0 | 0.88 | 0.10 | 0.02 | 0.954 | 0.414 |
| 112 | 100.0 | 1.76 | 0.20 | 0.04 | 0.954 | 0.414 |
| 113 | 100.0 | 4.4 | 0.50 | 0.10 | 0.954 | 0.414 |

TABLE 4

| Sample No. | $V_{1mA/mm}$ (V) | $_{0.1mA}\alpha_{1mA}$ | Rate of change in DC loading $\Delta V_{1mA}/V_{1mA}$(%) | Rate of change in surge $\Delta V_{1mA}/V_{1mA}$(%) |
| --- | --- | --- | --- | --- |
| 111 | 8~20 | 6~11 | −25~−16 | −50~−40 |
| 112 | 13~23 | 10~18 | −22~−17 | −25~−16 |
| 113 | 15~25 | 8~15 | −28~−16 | −22~−14 |

According to the zinc oxide varistor produced by the zinc oxide ceramics according to the prior art as shown in Tables 3, and 4 $V_{1mA}$ was considerably decreased after DC loading of 0.2 W, and the absolute value of the rate of change in DC loading $\Delta V_{1mA}/V_{1mA}$ was 10% or more. In addition, the absolute value of the rate of change in surge exceeds 10% so that reliability was very poor. As shown in Table 4, the variation within the lots was great.

The variation in electric characteristic between the lots of the zinc oxide varistor produced by the ceramics according to the prior art was greater than the variation in the lots, which is not shown in Table 4. A lot of varistors had $V_{1mA}/mm$ and α values which are smaller than values shown in Table 4.

In the method according to the prior art, a sintering temperature of 950° C. is too low for the production of the zinc oxide varistor. When the conventional ceramics are burnt at a high temperature, for example, 1250° C., a varistor having very good characteristics can be obtained.

As apparent from the comparison between Example 1 and Comparative Example, it was proved that the zinc oxide varistor produced by sintering the zinc oxide ceramics of the present invention at a low temperature is superior to the zinc oxide varistor produced by the ceramics according to the prior art in initial electric characteristics, reliability, and variations in electric characteristic within and between lots.

EXAMPLE 2

The blending and heat treating temperature are changed to produce ceramics in the same manner as in Example 1. First of all, bismuth oxide ($Bi_2O_3$) powder, titanium oxide ($TiO_2$) fine powder and antimony oxide ($Sb_2O_3$) fine powder were mixed at a weight ratio of 81:9:10. The mixed powder was heat treated for 5 hrs. at a temperature of 800° C. in the air, and then fine ground so that bismuth oxide/titanium oxide/antimony oxide synthetic powder (whose particles pass through a 325-mesh screen) was obtained. If the mixed powder treated by heat at a temperature of 800° C. is ground in advance with an automatic mortar, the synthetic powder can be easily obtained as with the grinding of each powder.

Then, zinc oxide powder, bismuth oxide/titanium oxide/antimony oxide synthetic powder, cobalt oxide powder and manganese oxide were blended at a weight ratio of 100:3.5:0.80:0.40, mixed and ground by the wet method. The ground powder was dried, and mixed with an aluminum nitrate solution which contains 0.0013 part by weight of aluminum oxide for 100 parts by weight of ZnO by $Al_2O_3$ conversion.

In order to evaluate electric characteristics, the sintering temperature is changed to produce a zinc oxide varistor in the same manner as in Example 1. First of all, zinc oxide ceramics which contain aluminum oxide are compressed and molded into a disk. The temperature of the molded body was raised at a speed of 50° C./hr. Then, the molded body was held for 15 hrs. at temperatures of 800° C., 850° C., 900° C., 950° C., 1000° C., 1050° C. 1100° C., and 1150° C. Thereafter, the temperatures of the molded body were lowered at a speed of 50° C./hr so that respective sintered bodies were obtained. Each sintered body had a thickness of 1.2 mm and a diameter of 14 mm.

Then, the zinc oxide varistor was produced. The electric characteristics of zinc oxide varistor are evaluated. Table 5 shows sample compositions, and Table 6 shows the results of the evaluation of the electric characteristics.

TABLE 5

| Sample No. | Sintering temperature (° C.) | ZnO (part by wt) | $Bi_2O_3$—$TiO_2$—$Sb_2O_3$ Synthetic fine particles (*) (part by wt) | CoO (part by wt) | $MnO_2$ (part by wt) | $Al_2O_3$ (part by wt) |
|---|---|---|---|---|---|---|
| 201 | 800 | 100.0 | 3.5 | 0.80 | 0.400 | 0.0013 |
| 202 | 850 | 100.0 | 3.5 | 0.80 | 0.400 | 0.0013 |
| 203 | 900 | 100.0 | 3.5 | 0.80 | 0.400 | 0.0013 |
| 204 | 950 | 100.0 | 3.5 | 0.80 | 0.400 | 0.0013 |
| 205 | 1000 | 100.0 | 3.5 | 0.80 | 0.400 | 0.0013 |
| 206 | 1050 | 100.0 | 3.5 | 0.80 | 0.400 | 0.0013 |
| 207 | 1100 | 100.0 | 3.5 | 0.80 | 0.400 | 0.0013 |
| 208 | 1150 | 100.0 | 3.5 | 0.80 | 0.400 | 0.0013 |

(*) Heat treatment of a mixture $Bi_2O_3$:$TiO_2$:$Sb_2O_3$ = 81:9:10 (weight ratio)

TABLE 6

| Sample No. | $V_{1mA/mm}$ (V) | $_{0.1mA}\alpha_{1mA}$ | Rate of change in DC loading $\Delta V_{1mA}/V_{1mA}(\%)$ | Rate of change in surge $\Delta V_{1mA}/V_{1mA}(\%)$ |
|---|---|---|---|---|
| 201 | 330~380 | 10~30 | −40~−30 | −22~−18 |
| 202 | 250~300 | 35~45 | −4~−1 | −4~+1 |
| 203 | 220~240 | 38~44 | −4~−1 | −4~+2 |
| 204 | 215~230 | 40~46 | −4~−2 | −3~+1 |
| 205 | 210~230 | 40~48 | −2~0 | −3~+1 |
| 206 | 205~220 | 40~50 | −2~−1 | −2~+2 |
| 207 | 200~215 | 40~50 | −3~−2 | −2~+1 |
| 208 | 190~205 | 40~50 | −3~−1 | −4~+2 |

As a result of sintering at a temperature of 850 to 1150° C. as shown in Tables 5 and 6, the zinc oxide varistor produced from the ceramics according to the present invention had a low threshold voltage and the absolute value of the rate of change $\Delta V_{1mA}/V_{1mA}$ in threshold voltage $V_{1mA}$ was 5% or less for long-time DC loading and surge so that great reliability could be obtained. As shown in Table 6, the variation of the electric characteristics within lots was small. The zinc oxide varistor obtained by sintering at a temperature of 1150° C. or more also has excellent characteristics, but is not preferred because an element body is deformed during sintering or elements stick together so that the yield is lowered.

When the zinc oxide varistor was produced by the zinc oxide ceramics according to the present invention, the electric characteristics between lots was small similarly to the variation within lots so that the yield was considerably enhanced, which is not shown in Table 6.

EXAMPLE 3

The blending and heat treating temperature are changed to produce ceramics in the same manner as in Example 1. First of all, bismuth oxide powder, titanium oxide fine powder and antimony oxide fine powder were mixed at a weight ratio shown in the column of synthetic powder of Table 7. The mixed powder was heat treated for 5 hrs. at a temperature of 500° C. in the air, and then fine ground so that bismuth oxide/titanium oxide/antimony oxide synthetic powder was obtained. If the mixed powder heat treated at a temperature of 500° C. is ground in advance with an automatic mortar, the synthetic powder can be easily obtained as with the grinding of each powder.

Then, zinc oxide powder, cobalt oxide powder, manganese oxide powder and bismuth oxide/titanium oxide/antimony oxide synthetic powder were blended at a weight ratio shown in Table 7, mixed and ground by the wet method. The ground powder was dried, and mixed with an aluminum nitrate solution which contains 0.0013 part by weight of aluminum for 100 parts by weight of zinc oxide by $Al_2O_3$ conversion.

In order to evaluate the electric characteristics, zinc oxide ceramics which contain aluminum oxide were respectively compressed and molded into a disk in the same manner as in Example 1. The temperature of the molded body was raised at a speed of 100° C./hr. in the air. Then, the molded body was held for 2 hrs. at a temperature of 1050° C. Then, the temperature of the molded body was lowered at a speed of 100° C./hr so that respective sintered bodies were obtained. Each sintered body had a thickness of 1.2 mm and a diameter of 14 mm.

Then, the zinc oxide varistor was produced in the same manner as in Example 1. The electric characteristics of the zinc oxide varistor are evaluated. Table 7 shows sample compositions, and Table 8 shows the results of the evaluation of the electric characteristics.

TABLE 7

| Sample No. | ZnO (part by weight) | $Bi_2O_3 + TiO_2 + Sb_2O_3$ Synthetic powder (part by weight) | | | CoO (part by weight) | $MnO_2$ (part by weight) | $Al_2O_3$ (part by weight) |
|---|---|---|---|---|---|---|---|
| | | $Bi_2O_3$ | $TiO_2$ | $Sb_2O_3$ | | | |
| 301 | 100.0 | 0.2 | 0.1 | 0.02 | 0.50 | 0.50 | 0.0013 |
| 302 | 100.0 | 0.5 | 0.1 | 0.02 | 0.50 | 0.50 | 0.0013 |
| 303 | 100.0 | 10.0 | 1.5 | 0.3 | 0.50 | 0.50 | 0.0013 |
| 304 | 100.0 | 15.0 | 1.5 | 0.3 | 0.3 | 0.50 | 0.50 |
| 305 | 100.0 | 0.5 | 0.05 | 0.02 | 0.50 | 0.50 | 0.0013 |
| 306 | 100.0 | 10.0 | 5.0 | 1.0 | 0.50 | 0.50 | 0.0013 |
| 307 | 100.0 | 10.0 | 7.0 | 1.0 | 0.50 | 0.50 | 0.0013 |
| 308 | 100.0 | 0.5 | 0.1 | 0.01 | 0.50 | 0.50 | 0.0013 |
| 309 | 100.0 | 2.5 | 0.5 | 2.5 | 0.50 | 0.50 | 0.0013 |
| 310 | 100.0 | 2.5 | 0.5 | 2.5 | 0.50 | 0.50 | 0.0013 |

TABLE 8

| Sample No. | $V_{1mA/mm}$ (V) | $_{0.1mA}\alpha_{1mA}$ | Rate of change in DC loading $\Delta V_{1mA}/V_{1mA}(\%)$ | Rate of change in surge $\Delta V_{1mA}/V_{1mA}(\%)$ |
|---|---|---|---|---|
| 301 | 15~21 | 11~16 | −14~−5 | −28~−15 |
| 302 | 23~26 | 18~23 | −4~0 | −4~+1 |
| 303 | 24~28 | 21~24 | −3~+1 | −3~+1 |
| 304 | — | — | — | — |
| 305 | 84~95 | 25~36 | −22~−8 | −30~−18 |
| 306 | 101~110 | 42~50 | −4~+2 | −4~+2 |
| 307 | 20~70 | 12~25 | −17~−10 | −25~−5 |
| 308 | 25~40 | 15~25 | −11~−6 | −35~−20 |
| 309 | 120~140 | 40~52 | −3~+2 | +2~+4 |
| 310 | 150~210 | 22~35 | −12~−6 | −18~−10 |

According to the zinc oxide varistor produced from the zinc oxide ceramics of the present invention as shown in Tables 7 and 8, when the amount of bismuth oxide contained in $Bi_2O_3/TiO_2/Sb_2O_3$ synthetic powder was 0.5 part by weight or more for 100 parts by weight of zinc oxide, α values were great and the absolute value of the rate of change in the threshold voltage $V_{1mA}$ was 5% or less for the long-time DC loading and surge so that good reliability could be obtained.

If the amount of the synthetic powder to be added exceeds 15 parts by weight (sample No.304), the molded bodies are overlapped and burned so that sintered bodies stick together. Consequently, the production of the varistor in high quantities cannot be obtained. When the amount of titanium oxide contained in bismuth oxide/titanium oxide/antimony oxide synthetic powder to be added was 0.1 to 5.0 parts by weight for 100 parts by weight of zinc oxide, good electric characteristics could be obtained. When the amount of antimony oxide contained in bismuth oxide/titanium oxide/antimony oxide synthetic powder to be added was 0.02 to 2.5 parts by weight for 100 parts by weight of zinc oxide, good electric characteristics could be obtained.

EXAMPLE 4

Boron oxide is added to the synthetic powder and the heat treating temperature is changed in producing ceramics in the same manner as in Example 1. First of all, bismuth oxide ($Bi_2O_3$) powder, titanium oxide ($TiO_2$) powder, antimony oxide ($Sb_2O_3$), and boron oxide ($B_2O_3$) (whose particles pass through a 200-mesh screen) were blended at a weight ratio of 88:9:2:1. The blended powder was heated at a temperature of 600° C. for 5 hrs, and then ground fine so that synthetic powder was obtained. The synthetic powder which is prepared from bismuth oxide, titanium oxide and antimony oxide is called bismuth oxide/titanium oxide/antimony oxide/boron oxide synthetic powder. If the blended powder which has been treated by heat at the temperature of 600° C. is ground in advance by means of an automatic mortar, it is not very hard to obtain the synthetic powder in a manner similar to the grinding of each powder.

Zinc oxide powder, bismuth oxide/titanium oxide/antimony oxide/boron oxide synthetic powder, cobalt oxide (CoO) powder, and manganese oxide ($MnO_2$) powder were blended at a weight ratio of 100:0.2 to 20.0:0.954:0.414 while changing the amount of the bismuth oxide/titanium oxide/antimony oxide/boron oxide synthetic powder. The blended powder was mixed and ground by the wet method. The ground powder was dried.

In order to evaluate electric characteristics, the zinc oxide varistor shown in FIG. 1 is produced in the same manner as in Example 1.

The ceramics were compressed and molded into a disk. The molded product thus obtained was heated at a speed of 50° C./hr in the air, held for 13 hrs. at a temperature of 950° C. and cooled at a speed of 50° C./hr. Consequently, sintered products were obtained. The sintered product had a thickness of 1.2 mm and a diameter of 14 mm. Then, aluminum was sprayed on the both sides of a sintered body 11 to form an aluminum layer (not shown).

Then, copper was sprayed on the aluminum layer to form an electrode 12. A lead wire 13 was bonded to the electrode 12 by a solder. Then, the portions of the molded bodies other than the lead wire 13 were coated so that the zinc oxide varistor was obtained.

The electric characteristics and the reliability for DC loading of the zinc oxide varistor thus obtained were evaluated in the same manner as in Example 1.

Table 9 shows sample compositions, and Table 10 shows the results of evaluation of electric characteristics. The numeric values which show the results of evaluation of the electric characteristics are minimum and maximum values within lots.

TABLE 9

| Sample No. | ZnO (part by weight) | $Bi_2O_3$—$TiO_2$—$Sb_2O_3$—$B_2O_3$ Synthetic powder (*) (part by weight) | CoO (part by weight) | $MnO_2$ (part by weight) |
|---|---|---|---|---|
| 121 | 100.0 | 0.2 | 0.954 | 0.414 |
| 122 | 100.0 | 0.5 | 0.954 | 0.414 |
| 123 | 100.0 | 0.7 | 0.954 | 0.414 |
| 124 | 100.0 | 1.0 | 0.954 | 0.414 |
| 125 | 100.0 | 2.0 | 0.954 | 0.414 |

TABLE 9-continued

| Sample No. | ZnO (part by weight) | $Bi_2O_3$—$TiO_2$—$Sb_2O_3$—$B_2O_3$ Synthetic powder (*) (part by weight) | CoO (part by weight) | $MnO_2$ (part by weight) |
|---|---|---|---|---|
| 126 | 100.0 | 5.0 | 0.954 | 0.414 |
| 127 | 100.0 | 10.0 | 0.954 | 0.414 |
| 128 | 100.0 | 15.0 | 0.954 | 0.414 |
| 129 | 100.0 | 20.0 | 0.954 | 0.414 |

(*) Heat treatment of $Bi_2O_3:TiO_2:Sb_2O_3:B_2O_3 = 88:9:2:1$ (weight ratio)

TABLE 10

| Sample No. | $V_{1mA/mm}$ (V) | $_{0.1mA}\alpha_{1mA}$ | Rate of change in DC loading $\Delta V_{1mA}/V_{1mA}(\%)$ | Rate of change in surge $\Delta V_{1mA}/V_{1mA}(\%)$ |
|---|---|---|---|---|
| 121 | 7~15 | 9~15 | −28~−18 | −39~−32 |
| 122 | 24~28 | 20~26 | −4~−1 | −4~−2 |
| 123 | 26~31 | 30~34 | −2~+2 | −2~+1 |
| 124 | 24~29 | 31~34 | −2~+1 | −3~0 |
| 125 | 22~26 | 30~34 | −2~0 | −1~+3 |
| 126 | 23~26 | 32~35 | −2~0 | −2~+2 |
| 127 | 22~25 | 30~34 | −3~−1 | −1~+2 |
| 128 | 24~27 | 31~35 | −2~−2 | −2~+2 |
| 129 | — | — | — | — |

As is apparent from Tables 9 and 10, the zinc oxide varistor produced from the zinc oxide ceramics according to the present invention had a low threshold voltage and the absolute value of the rate of change $\Delta V_{1mA}/V_{1mA}$ of the threshold voltage $VV_{1mA}$ was 5% or less for the long-time DC loading and surge so that great reliability could be obtained, except for sample No.121 having 0.2 part by weight of bismuth oxide/titanium oxide/antimony oxide/boron oxide synthetic powder. As shown in Table 2, the electric characteristics within lots had small variations.

When the zinc oxide varistor was produced by the zinc oxide ceramics according to the present invention, the electric characteristics between lots had small variation similar to the variation in lots, which is not shown in Table 10. As a result, the yield could be enhanced considerably. When the amount of $Bi_2O_3$-$TiO_2$-$Sb_2O_3$ synthetic powder to be added exceeded 20 parts by weight, samples stuck together so that measurement could not be performed (sample No.109).

COMPARATIVE EXAMPLE 2

By using sintered bodies having the same compositions as in Example 4, three kinds of zinc oxide varistors were produced by a method in which the synthetic powder of bismuth oxide powder, titanium oxide fine powder, antimony oxide powder and boron oxide is not prepared according to the prior art.

Zinc oxide powder, bismuth oxide powder, titanium oxide fine powder, antimony oxide powder, boron oxide, cobalt oxide powder and manganese oxide powder were blended at a weight ratio of 100:0.88:0.09:0.02:0.01:0.954:0.414 (sample No.131), 100:1.76:0.18:0.04:0.02:0.954:0.414 (sample No.132), and 100:4.4:0.45:0.1:0.05:0.954:0.414 (sample No.133). The blended powder was mixed and ground by the wet method in the same manner as in Example 4 except that the blended powder was not synthesized. The powder material thus obtained was dried.

The powder thus obtained was compressed and molded into a dark. The temperature of the molded body was raised at a speed of 50° C./hr in the air. Then, the molded body was held for 13 hrs. at a temperature of 950° C. Thereafter, the temperature of the molded body was lowered at a speed of 50° C./hr so that a sintered body was obtained. The sintered body had a thickness of 1.2 mm and a diameter of 14 mm.

In the same manner as in Example 1, a zinc oxide varistor was produced. The electric characteristics of the zinc oxide varistor are evaluated. Table 11 shows sample compositions, and Table 12 shows the results of the evaluation of the electric characteristics.

TABLE 11

| Sample No. | ZnO (part by wt) | $Bi_2O_3$ (part by wt) | $TiO_2$ (part by wt) | $Sb_2O_3$ (part by wt) | $B_2O_3$ (part by wt) | CoO (part by wt) | $MnO_2$ (part by wt) |
|---|---|---|---|---|---|---|---|
| 131 | 100.0 | 0.88 | 0.09 | 0.02 | 0.01 | 0.954 | 0.414 |
| 132 | 100.0 | 1.76 | 0.18 | 0.04 | 0.02 | 0.954 | 0.414 |
| 133 | 100.0 | 4.4 | 0.45 | 0.1 | 0.05 | 0.954 | 0.414 |

TABLE 12

| Sample No. | $V_{1mA/mm}$ (V) | $_{0.1mA}\alpha_{1mA}$ | Rate of change in DC loading $\Delta V_{1mA}/V_{1mA}(\%)$ | Rate of change in surge $\Delta V_{1mA}/V_{1mA}(\%)$ |
|---|---|---|---|---|
| 131 | 9~19 | 7~14 | −28~−19 | −46~−33 |
| 132 | 11~25 | 8~17 | −23~−19 | −24~−18 |
| 133 | 14~25 | 8~14 | −28~−18 | −28~−12 |

According to the zinc oxide varistor produced from the zinc oxide ceramics according to the prior art as shown in tables 11 and 12, $V_{1mA}$ was considerably decreased after DC loading of 0.2 W, and the absolute value of the rate of change in DC loading $\Delta V_{1mA}/V_{1mA}$ was 10% or more. In addition, the absolute value of the rate of change in surge exceeded 15% so that reliability was very poor. As shown in Table 12, the variation within the lots was great.

The variation between the lots in electric characteristics of the zinc oxide varistor produced from the zinc oxide ceramics according to the prior art was greater than the variation within the lots, which is not shown in Table 12. A lot of varistors had $V_{1mA}/_{mm}$ and $\alpha$ values which are smaller than the values shown in Table 12.

In the method according to the prior art, a sintering temperature of 950° C. is too low for the production of the zinc oxide varistor. When the conventional ceramics are burnt at a high temperature, for example, 1250° C., a varistor having very good characteristics can be obtained.

As is apparent from the comparison between Example 4 and Comparative Example 2, it was proved that the zinc oxide varistor produced by the zinc oxide ceramics of the present invention with low-temperature sintering is superior to the zinc oxide varistor produced by the method for producing the zinc oxide ceramics according to the prior art in initial electric characteristics, reliability, and variations in electric characteristics within and between lots.

EXAMPLE 5

Boron oxide is added for the blending of synthetic powder. In addition, two kinds of synthetic powder are prepared and a heat treating temperature is changed to produce ceramics in the same manner as in Example 1. First of all, bismuth oxide powder, titanium oxide and antimony oxide fine powder were blended at a weight ratio of 81:9:10. The blended powder was heat treated for 5 hrs. at a temperature of 550° C. to prepare a first synthetic powder. Further, bismuth oxide fine particles and boron oxide fine powder were blended at a weight ratio of 93:7. The blended powder was heat treated for 5 hrs. at a temperature of 550° C. to prepare another kind of synthetic powder. These two kinds of synthetic powder were blended at a weight ratio of 10:1 and finely ground so as to pass through a 325-mesh screen. Consequently, bismuth oxide/titanium oxide/antimony oxide+bismuth oxide/boron oxide synthetic powder was obtained. If the blended powder which has been heat treated at the temperature of 550° C. is ground in advance by means of an automatic mortar, it is not very hard to obtain the synthetic powder in a manner similar to the grinding of each powder.

Then, zinc oxide powder, bismuth oxide/titanium oxide/antimony oxide synthetic powder, bismuth oxide/boron oxide powder, cobalt oxide powder and manganese oxide powder were blended at a weight ratio of 100:3.3:0.80:0.40, mixed and ground by the wet method in the same manner as in Example 1. The ground powder was dried, and mixed with an aluminum nitrate solution which contains 0.0013 part by weight of aluminum oxide for 100 parts by weight of ZnO by $Al_2O_3$ conversion.

The zinc oxide ceramics thus obtained were compressed and molded into a disk. The temperature of a molded body was raised at a speed of 50° C./hr in the air. Then, the molded body was held for 15 hrs. at temperatures of 700° C., 750° C., 800° C., 900° C., 1000° C., 1050° C., 1100° C., and 1150° C. Thereafter, the temperatures of the molded body were lowered at a speed of 50° C./hr so that respective sintered bodies were obtained. Each sintered body had a thickness of 1.2 mm and a diameter of 14 mm.

Then, the zinc oxide varistor shown in FIG. 1 was produced. The electric characteristics of the zinc oxide varistor were evaluated. Table 13 shows sample compositions, and Table 14 shows the results of evaluation of electric characteristics.

TABLE 13

| Sample No. | Sintering temperature (° C.) | ZnO (part by wt) | $(Bi_2O_3$—$TiO_2$—$Sb_2O_3)$ + $(Bi_2O_3$—$B_2O_3)$ Synthetic fine particles | | CoO (part by wt) | MnO_2 (part by wt) | $Al_2O_3$ (part by wt) |
|---|---|---|---|---|---|---|---|
| | | | $Bi_2O_3$—$TiO_2$—$Sb_2O_3$ Synthetic fine particles (part by wt) (*) | $Bi_2O_3$—$B_2O_3$ Synthetic fine particles (part by wt) (**) | | | |
| 221 | 700 | 100.0 | 3.0 | 0.3 | 0.80 | 0.400 | 0.0013 |
| 222 | 750 | 100.0 | 3.0 | 0.3 | 0.80 | 0.400 | 0.0013 |
| 223 | 800 | 100.0 | 3.0 | 0.3 | 0.80 | 0.400 | 0.0013 |
| 224 | 900 | 100.0 | 3.0 | 0.3 | 0.80 | 0.400 | 0.0013 |
| 225 | 1000 | 100.0 | 3.0 | 0.3 | 0.80 | 0.400 | 0.0013 |
| 226 | 1050 | 100.0 | 3.0 | 0.3 | 0.80 | 0.400 | 0.0013 |
| 227 | 1100 | 100.0 | 3.0 | 0.3 | 0.80 | 0.400 | 0.0013 |
| 228 | 1150 | 100.0 | 3.0 | 0.3 | 0.80 | 0.400 | 0.0013 |

(*) Heat treatment of a mixture $Bi_2O_3:TiO_2:Sb_2O_3$ = 81:9:10 (weight ratio)
(**) Heat treatment of a mixture $Bi_2O_3:B_2O_3$ = 93:7 (weight ratio)

TABLE 14

| Sample No. | $V_{1mA/mm}$ (V) | $_{0.1mA}\alpha_{1mA}$ | Rate of change in DC loading $\Delta V_{1mA}/V_{1mA}(\%)$ | Rate of change in surge $\Delta V_{1mA}/V_{1mA}(\%)$ |
|---|---|---|---|---|
| 221 | 310~370 | 12~28 | −25~−11 | −27~−15 |
| 222 | 280~330 | 35~46 | −4~−1 | −3~+1 |
| 223 | 260~280 | 37~43 | −3~0 | −4~+1 |
| 224 | 255~285 | 38~44 | −4~−1 | −4~+2 |
| 225 | 240~270 | 31~45 | −3~0 | −3~+1 |
| 226 | 215~235 | 40~55 | −2~0 | −3~0 |
| 227 | 210~225 | 45~50 | −3~−1 | −2~+3 |
| 228 | 195~210 | 45~58 | −3~−1 | −3~+2 |

As a result of sintering at a temperature of 750 to 1150° C. which is shown in Tables 13 and 14, the zinc oxide varistor produced from the zinc oxide ceramics according to the present invention had a low threshold voltage and the absolute value of the rate of change $\Delta V_{1mA}/V_{1mA}$ in the threshold voltage $V_{1mA}$ was 5% or less for long-time DC loading and surge so that great reliability could be obtained. As shown in Table 14, the variation in electric characteristic within lots was small. The zinc oxide varistor obtained by sintering at a temperature of 1150° C. or more also has excellent characteristics, but is not preferred because an element body is deformed during sintering or elements stick together so that the yield is lowered.

When the zinc oxide varistor was produced from the zinc oxide ceramics according to the present invention, the variation in electric characteristic between lots was small similar to the variation in electric characteristics within lots so that the yield was considerably enhanced, which is not shown in Table 14.

EXAMPLE 6

The blending is changed to prepare two kinds of synthetic powder, and a heat treating temperature is changed in producing ceramics in the same manner as in Example 1. First of all, titanium oxide fine powder, bismuth oxide powder and antimony oxide fine powder were mixed at a weight ratio of 81:9:10. The mixed powder was heat treated for 5 hrs. at a temperature of 550° C. Further, bismuth oxide fine particles and boron oxide fine powder were mixed. The mixed powder was heat treated for 5 hrs. at a temperature of 550° C. These were blended at a weight ratio of 97.5:2.5, 95.0:5.0, 92.5:7.5, 90.0:10.0, 87.5:12.5, 85.0:15.0, 82.5:17.5, and 80.0:20.0 and fine ground so that eight kinds of bismuth oxide/titanium oxide/antimony oxide+bismuth oxide/boron oxide synthetic powder are obtained. If the mixed powder treated by heat at a temperature of 550° C. is ground in advance by means of an automatic mortar, the synthetic powder can be easily obtained as in the grinding of each powder.

Then, zinc oxide powder, bismuth oxide/titanium oxide/antimony oxide+bismuth oxide/boron oxide synthetic powder, cobalt oxide powder and manganese oxide powder were blended at a weight ratio of 100:4.0:0.50:0.50, and mixed and ground by the wet method in the same manner as in Example 1. The ground powder was dried, and mixed with an aluminum nitrate solution which contains 0.0013 part by weight of aluminum oxide for 100 parts by weight of ZnO by $Al_2O_3$ conversion. Consequently, zinc oxide ceramics were obtained.

Similarly to Example 1, the zinc oxide ceramics were compressed and molded into a disk. The temperature of the molded body was raised at a speed of 50° C./hr. Then, the molded body was held for 12 hrs. at a temperature of 950° C. Then, the temperature of the molded body was lowered at a speed of 50° C./hr so that respective sintered bodies were obtained. Each sintered body had a thickness of 1.2 mm and a diameter of 14 mm.

Then, the zinc oxide varistor shown in FIG. 1 was produced. The electric characteristics of the zinc oxide varistor are evaluated. Table 15 shows sample compositions, and Table 16 shows the results of the evaluation of the electric characteristics.

TABLE 15

| Sample No. | ZnO (part by wt) | $(Bi_2O_3-TiO_2-Sb_2O_3) + (Bi_2O_3-B_2O_3)$ Synthetic fine particles | | CoO (part by wt) | $MnO_2$ (part by wt) | $Al_2O_3$ (part by wt) |
|---|---|---|---|---|---|---|
| | | $Bi_2O_3-TiO_2-Sb_2O_3$ Synthetic fine particles (part by wt) (*) | $Bi_2O_3-B_2O_3$ Synthetic fine particles (part by wt) (**) | | | |
| 321 | 100.0 | 3.9 (97.5) | 0.1 (2.5) | 0.50 | 0.50 | 0.0013 |
| 322 | 100.0 | 3.8 (95.0) | 0.2 (5.0) | 0.50 | 0.50 | 0.0013 |
| 323 | 100.0 | 3.7 (92.5) | 0.3 (7.5) | 0.50 | 0.50 | 0.0013 |
| 324 | 100.0 | 3.6 (90.0) | 0.4 (10.0) | 0.50 | 0.50 | 0.0013 |
| 325 | 100.0 | 3.5 (87.5) | 0.5 (12.5) | 0.50 | 0.50 | 0.0013 |
| 326 | 100.0 | 3.4 (85.0) | 0.6 (15.0) | 0.50 | 0.50 | 0.0013 |
| 327 | 100.0 | 3.3 (82.5) | 0.7 (17.5) | 0.50 | 0.50 | 0.0013 |
| 328 | 100.0 | 3.2 (80.0) | 0.8 (20.0) | 0.50 | 0.50 | 0.0013 |

(*) Heat treatment of a mixture $Bi_2O_3:TiO_2:Sb_2O_3 = 89:8:3$ (weight ratio)
(**) Heat treatment of a mixture $Bi_2O_3:B_2O_3 = 93:7$ (weight ratio)

TABLE 16

| Sample No. | $V_{1mA/mm}$ (V) | $_{0.1mA}\alpha_{1mA}$ | Rate of change in DC loading $\Delta V_{1mA}/V_{1mA}(\%)$ | Rate of change in surge $\Delta V_{1mA}/V_{1mA}(\%)$ |
|---|---|---|---|---|
| 321 | 11~16 | 15~27 | −4~−2 | −3~0 |
| 322 | 22~25 | 25~31 | −4~0 | −3~+1 |
| 323 | 24~30 | 25~30 | −3~−1 | −3~+1 |
| 324 | 36~42 | 35~40 | −2~0 | −1~+2 |
| 325 | 80~96 | 45~52 | −1~+3 | −3~−1 |
| 326 | 94~112 | 50~60 | −4~−2 | −4~0 |
| 327 | 108~115 | 50~60 | −17~−10 | −4~−1 |
| 328 | 125~140 | 55~65 | −11~−6 | −4~−2 |

According to the zinc oxide varistor produced from the zinc oxide ceramics of the present invention as shown in Tables 15 and 16, a withstand voltage is changed depending on the ratio of bismuth oxide/titanium oxide/antimony oxide synthetic powder and bismuth oxide/boron oxide to be added. If the ratio ranges from 90:10 to 12.5 87.5, a zinc oxide varistor for a low voltage is obtained. If the amount of bismuth oxide/titanium oxide/antimony oxide synthetic powder is larger than that of bismuth oxide/boron oxide, the zinc oxide varistor for a low voltage is obtained. If the amount of bismuth oxide/boron oxide is greater than 87.5:12.5, a zinc oxide varistor for a high voltage is obtained. In any case, α values are great and the absolute value of the rate of change $\Delta V_{1mA}/V_{1mA}$ in the threshold voltage $V_{1mA}$ is 5% or less for long-time DC loading and surge, so that excellent reliability could be obtained.

In particular, two kinds of synthetic powder are obtained to produce the zinc oxide ceramics. Therefore, even if sintering is performed at a low temperature of 750° C., the liquid phase reaction can be controlled more effectively.

Consequently, a zinc oxide varistor having ZnO particles uniformly grown can be produced.

The ratio of bismuth oxide/titanium oxide/antimony oxide synthetic powder to bismuth oxide/boron oxide synthetic fine particles are shown in parentheses in the column of synthetic fine particles shown in Table 15. Aluminum components are dissolved in ZnO particles and act as the donor of a semiconductor. Consequently, the electric resistance of ZnO can be lowered.

In place of boron oxide, boric acid may be used for the synthetic powder.

EXAMPLE 7

Chromium oxide is added to synthetic powder to produce ceramics in the same manner as in Example 1. First of all, bismuth oxide ($Bi_2O_3$) powder, titanium oxide ($TiO_2$) powder, antimony oxide ($Sb_2O_3$), and chromium oxide ($Cr_2O_3$) (whose particles pass through a 325-mesh screen) were mixed at a weight ratio of 88:9:2:1. The mixed powder was heated at a temperature of 600° C. for 5 hrs, and then fine ground so that a synthetic powder (whose particles pass through the 325-mesh screen) was obtained. The synthetic powder which is prepared from bismuth oxide, titanium oxide, antimony oxide and chromium oxide is called bismuth oxide/titanium oxide/antimonyoxide/chromium oxide synthetic powder. The synthetic powder can be ground in advance by means of an antomatic mortar easily.

Zinc oxide (ZnO) powder, bismuth oxide/titanium oxide/antimony oxide/chromium oxide synthetic powder, cobalt oxide (CoO) powder, and manganese oxide ($MnO_2$) powder were blended at a weight ratio of 100:0.2 to 20.0:0.954:0.414 while changing the amount of the bismuth oxide/titanium oxide/antimony oxide/chromium oxide synthetic powder. The blended powder was mixed and ground by the wet method. The ground powder was dried so that zinc oxide ceramics were obtained.

In order to evaluate the electric characteristics and the reliability upon DC loading, the zinc oxide varistor shown in FIG. 1 was produced.

First of all, the ceramics were compressed and molded into a disk. The temperature of the molded body was raised at a speed of 50° C./hr in the air, held for 13 hrs. at a temperature of 950° C. and cooled at a speed of 50° C./hr. Consequently, a sintered body was obtained. The sintered body had a thickness of 1.2 mm and a diameter of 14 mm. Then, aluminum was sprayed on the both sides of a sintered body 11 to form an aluminum layer (not shown). Then, copper was sprayed on the aluminum layer to form an electrode 12 as shown in FIG. 1. A lead wire 13 was bonded to the electrode 12 by a solder. Then, the portions of the molded bodies other than the lead wire 13 were coated so that the zinc oxide varistor was obtained.

The electric characteristics and the reliability upon DC loading of the zinc oxide varistor thus obtained were evaluated in the same manner as in Example 1. Table 17 shows sample compositions, and Table 18 shows the results of the evaluation of the electric characteristics. The numeric values which show the results of evaluation of the electric characteristics are minimum and maximum values within lots.

TABLE 17

| Sample No. | ZnO (part by weight) | $Bi_2O_3$—$TiO_2$—$Sb_2O_3$ Synthetic powder (*) (part by weight) | CoO (part by weight) | $MnO_2$ (part by weight) |
| --- | --- | --- | --- | --- |
| 141 | 100.0 | 0.2 | 0.954 | 0.414 |
| 142 | 100.0 | 0.5 | 0.954 | 0.414 |
| 143 | 100.0 | 0.7 | 0.954 | 0.414 |
| 144 | 100.0 | 1.0 | 0.954 | 0.414 |
| 145 | 100.0 | 2.0 | 0.954 | 0.414 |
| 146 | 100.0 | 5.0 | 0.954 | 0.414 |
| 147 | 100.0 | 10.0 | 0.954 | 0.414 |
| 148 | 100.0 | 15.0 | 0.954 | 0.414 |
| 149 | 100.0 | 20.0 | 0.954 | 0.414 |

(*) Heat treatment of $Bi_2O_3:TiO_2:Sb_2O_3:Cr_2O_3 = 88:9:2:1$ (weight ratio)

TABLE 18

| Sample No. | $V_{1mA/mm}$ (V) | $_{0.1mA}\alpha_{1mA}$ | Rate of change in DC loading $\Delta V_{1mA}/V_{1mA}(\%)$ | Rate of change in surge $\Delta V_{1mA}/V_{1mA}(\%)$ |
| --- | --- | --- | --- | --- |
| 141 | 5~12 | 10~14 | −25~−15 | −35~−30 |
| 142 | 21~25 | 15~24 | −4~−2 | −4~−1 |
| 143 | 22~26 | 30~33 | −1~+1 | −2~+1 |
| 144 | 24~28 | 30~35 | −1~+1 | −3~+1 |
| 145 | 25~29 | 31~34 | −1~0 | −2~+2 |
| 146 | 26~29 | 28~34 | −1~0 | −2~+1 |
| 147 | 25~27 | 29~35 | −3~−2 | −1~+2 |
| 148 | 26~29 | 30~34 | −3~−1 | −2~+1 |
| 149 | — | — | — | — |

As is apparent from Tables 17 and 18, the zinc oxide varistor produced by the method according to the present invention had a low threshold voltage and the absolute value of the rate of change $\Delta V_1/V_{1mA}$ in the threshold voltage $V_{1mA}$ was 5% or less for the long-time DC loading and surge so that great reliability could be obtained, except for sample No.141 having 0.2 part by weight of bismuth oxide/titanium oxide/antimony oxide/chromium oxide synthetic powder. As shown in Table 18, the electric characteristics within lots had small variations.

When the zinc oxide varistor was produced by the method according to the present invention, the variation in electric characteristic between lots was small similar to the variation in electric characteristics within lots so that product yield was considerably enhanced, which is not shown in Table 18. When the amount of bismuth oxide/titanium oxide/antimony oxide synthetic powder to be added exceeded 20 parts by weight, samples stuck together so that measurement could not be performed (sample No.149.

COMPARATIVE EXAMPLE 3

By using a sintered body having the same compositions as in Example 7, three kinds of zinc oxide varistors were produced by a method in which the synthetic powder of bismuth oxide powder, titanium oxide fine powder, antimony oxide powder and chromium oxide powder is not prepared according to the prior art.

Zinc oxide (ZnO) powder, bismuth oxide ($Bi_2O_3$) powder, titanium oxide ($TiO_2$) fine powder, antimony oxide ($Sb_2O_3$) powder, $B_2O_3$, chromium oxide ($Cr_2O_3$) powder, cobalt oxide (CoO) powder and manganese oxide ($MnO_2$) powder were blended at a weight ratio of 100:0.88:0.09:0.02:0.01:0.954:0.414 (sample No.151), 100:1.76:0.18:0.04:0.02:0.954:0.414 (sample No.152), and 100:4.4:0.45:0.1:0.05:0.954:0.414 (sample No.153). The blended powder was mixed and ground by the wet method. The mixed powder thus obtained was dried, and compressed and molded into a disk. The temperature of the molded body was raised at a speed of 50° C./hr in the air. Then, the molded body was held for 13 hrs. at a temperature of 950° C. Thereafter, the temperature of the molded body was lowered at a speed of 50° C./hr so that a sintered body was obtained. The sintered body had a thickness of 1.2 mm and a diameter of 14 mm.

In the same manner as in Example 1, a zinc oxide varistor was produced. The electric characteristics of the zinc oxide varistor are evaluated. Table 19 shows sample compositions, and Table 20 shows the results of the evaluation of the electric characteristics.

TABLE 19

| Sample No. | ZnO (part by weight) | $Bi_2O_3$ (part by weight) | $TiO_2$ (part by weight) | $Cr_2O_3$ (part by weight) | CoO (part by weight) | $MnO_2$ (part by weight) |
| --- | --- | --- | --- | --- | --- | --- |
| 151 | 100.0 | 0.88 | 0.09 | 0.02 | 0.954 | 0.414 |
| 152 | 100.0 | 1.76 | 0.18 | 0.04 | 0.954 | 0.414 |
| 153 | 100.0 | 4.4 | 0.45 | 0.1 | 0.954 | 0.414 |

TABLE 20

| Sample No. | $V_{1mA/mm}$ (V) | $_{0.1mA}\alpha_{1mA}$ | Rate of change in DC loading $\Delta V_{1mA}/V_{1mA}(\%)$ | Rate of change in surge $\Delta V_{1mA}/V_{1mA}(\%)$ |
| --- | --- | --- | --- | --- |
| 151 | 8~20 | 6~11 | −25~−16 | −50~−40 |
| 152 | 13~23 | 10~18 | −22~−17 | −25~−16 |
| 153 | 15~25 | 8~15 | −28~−16 | −22~−14 |

According to the zinc oxide varistor produced by the method according to the prior art as shown in tables 19 and 20, $V_{1mA}$ was considerably decreased after DC loading of 0.2 W, and the absolute value of the rate of change in DC loading $\Delta V_{1mA}/V_{1mA}$ was 10% or more. In addition, the absolute value of the rate of change in surge exceeded 10% so that reliability was rather poor. As shown in Table 20, the variation in electric characteristics within lots was great.

Referring to the zinc oxide varistor produced by the method according to the prior art, the variation in the electric characteristics between lots was much greater than the variation in electric characteristics within lots, which is not shown in Table 20. A lot of varistors had $V_{1mA}/mm$ and $\alpha$ values which are smaller than the values shown in Table 20.

In the method according to the prior art, a sintering temperature of 950° C. is too low for the production of the zinc oxide varistor. When burning at a high temperature, for example, 1250° C., a varistor having very good characteristics can be obtained by the method according to the prior art.

As apparent from the comparison between Example 4 and Comparative Example, it was proved that the zinc oxide varistor produced by sintering the zinc oxide ceramics of the present invention is superior to the zinc oxide varistor produced by the method according to the prior art in initial electric characteristics, reliability, and the variation in electric characteristic in and between lots.

EXAMPLE 8

Chromium oxide is blended and a heat treating temperature was changed in producing ceramics in the same manner as in Example 1. First of all, titanium oxide fine powder, bismuth oxide fine powder and antimony oxide fine powder were mixed at a weight ratio of 81:9:10. The mixed powder was heat treated for 5 hrs. at a temperature of 550° C. Further, bismuth oxide fine particles and chromium oxide fine powder (whose particles pass through a 325-mesh screen) were mixed at a weight ratio of 93:7. The mixed powder was treated by heat for 5 hrs. at a temperature of 550° C. These two kinds of synthetic powder were blended at a weight ratio of 10:1 and fine ground to obtain bismuth oxide/titanium oxide/antimony oxide+bismuth oxide/boron oxide synthetic powder (whose particles pass through the 325-mesh screen). If the heat treating temperature is increased, grinding is harder to perform.

Then, zinc oxide powder, bismuth oxide/titanium oxide/antimony oxide synthetic powder+bismuth oxide/chromium oxide powder, cobalt oxide powder and manganese oxide powder were blended at a weight ratio of 100:3.3:0.80:0.40, mixed and ground by the wet method. The ground powder was dried, and mixed with an aluminum nitrate solution which contains 0.0013 part by weight of aluminum oxide for 100 parts by weight of ZnO by $Al_2O_3$ conversion.

In the same manner as in Example 1, the zinc oxide ceramics were compressed and molded into a disk. The temperature of the molded body was raised at a speed of 50° C./hr in the air. Then, the molded body was held for 15 hrs. at temperatures of 700° C., 750° C., 800° C., 900° C., 1000° C., 1050° C. 1100° C., and 1150° C. Then, the temperatures of the molded body were lowered at a speed of 50° C./hr so that a sintered body was obtained. The sintered body had a thickness of 1.2 mm and a diameter of 14 mm.

In the same manner as in Example 1, a zinc oxide varistor was produced. The electric characteristics of the zinc oxide varistor were evaluated similarly to Example 1. Table 21 shows sample compositions, and Table 22 shows the results of the evaluation of the electric characteristics.

TABLE 21

| Sample No. | Sintering temperature (° C.) | ZnO (part by wt) | ($Bi_2O_3$—$TiO_2$—$Sb_2O_3$) + ($Bi_2O_3$—$Cr_2O_3$) Synthetic fine particles | | CoO (part by wt) | $MnO_2$ (part by wt) | $Al_2O_3$ (part by wt) |
| --- | --- | --- | --- | --- | --- | --- | --- |
| | | | $Bi_2O_3$—$TiO_2$—$Sb_2O_3$ Synthetic fine particles (part by wt) (*) | $Bi_2O_3$—$Cr_2O_3$ Synthetic fine particles (part by wt) (**) | | | |
| 241 | 700  | 100.0 | 3.0 | 0.3 | 0.80 | 0.400 | 0.0013 |
| 242 | 750  | 100.0 | 3.0 | 0.3 | 0.80 | 0.400 | 0.0013 |
| 243 | 800  | 100.0 | 3.0 | 0.3 | 0.80 | 0.400 | 0.0013 |
| 244 | 900  | 100.0 | 3.0 | 0.3 | 0.80 | 0.400 | 0.0013 |
| 245 | 1000 | 100.0 | 3.0 | 0.3 | 0.80 | 0.400 | 0.0013 |
| 246 | 1050 | 100.0 | 3.0 | 0.3 | 0.80 | 0.400 | 0.0013 |
| 247 | 1100 | 100.0 | 3.0 | 0.3 | 0.80 | 0.400 | 0.0013 |
| 248 | 1150 | 100.0 | 3.0 | 0.3 | 0.80 | 0.400 | 0.0013 |

(*) Heat treatment of a mixture $Bi_2O_3$:$TiO_2$:$Sb_2O_3$ = 81:9:10 (weight ratio)
(**) Heat treatment of a mixture $Bi_2O_3$:$Cr_2O_3$ = 93:7 (weight ratio)

TABLE 22

| Sample No. | $V_{1mA/mm}$ (V) | $\alpha_{0.1mA\text{-}1mA}$ | Rate of change in DC loading $\Delta V_{1mA}/V_{1mA}(\%)$ | Rate of change in surge $\Delta V_{1mA}/V_{1mA}(\%)$ |
| --- | --- | --- | --- | --- |
| 241 | 330~380 | 10~30 | −40~−30 | −22~−18 |
| 242 | 250~300 | 35~45 | −4~−1  | −4~+1 |
| 243 | 220~240 | 38~44 | −4~−1  | −4~+2 |
| 244 | 215~230 | 40~46 | −4~−2  | −3~+1 |
| 245 | 210~230 | 40~48 | −2~0   | −3~+1 |
| 246 | 205~220 | 40~50 | −2~−1  | −2~+2 |
| 247 | 200~215 | 40~50 | −3~−2  | −2~+1 |
| 248 | 190~205 | 40~50 | −3~−1  | −4~+2 |

As a result of sintering at a temperature of 750 to 1150° C. which is shown in Tables 21 and 22, the zinc oxide varistor produced by the method according to the present invention had a low threshold voltage and the absolute value of the rate of change $\Delta V_{1mA}/V_{1mA}$ in the threshold voltage $V_{1mA}$ was 5% or less for long-time DC loading and surge so that great reliability could be obtained. As shown in Table 22, the variation in electric characteristics within lots was small. The zinc oxide varistor obtained by sintering at a temperature of 1150° C. or more also has excellent characteristics, but is not preferred because an element body is deformed during sintering or elements stick together so that the yield is lowered.

When the zinc oxide varistor was produced by the method according to the present invention, the variation in the electric characteristics between lots was small similar to the variation in electric characteristics within lots so that the yield was considerably enhanced, which is not shown in Table 22.

EXAMPLE 9

The blending is changed to prepare two kinds of synthetic powder, and a heat treating temperature is changed in producing ceramics in the same manner as in Example 1. First of all, titanium oxide fine powder, bismuth oxide powder and antimony oxide fine powder were mixed at a weight ratio of 81:9:10. The mixed powder was treated for 5 hrs. at a temperature of 500° C. Further, bismuth oxide fine particles and chromium oxide fine powder were mixed. The mixed powder was treated for 5 hrs. at a temperature of 550° C. These were blended at a weight ratio of 97.5:2.5, 95.0:5.0, 92.5:7.5, 90.0:10.0, 87.5:12.5, 85.0:15.0, 82.5:17.5, and 80.0:20.0 and fine ground so that five kinds of bismuth oxide/titanium oxide/antimony oxide+bismuth oxide/chromium oxide synthetic powder (whose particles pass through a 325-mesh screen) are obtained. If the heat treating temperature is increased, grinding is harder to perform.

Then, zinc oxide powder, bismuth oxide/titanium zoxide/antimony oxide synthetic powder+bismuth oxide/chromium oxide synthetic powder, cobalt oxide powder and manganese oxide powder were blended at a weight ratio of 100:4.0:0.50:0.50, and mixed and ground by the wet method. The ground powder was dried, and mixed with an aluminum nitrate solution which contains 0.0013 part by weight of aluminum oxide for 100 parts by weight of ZnO by $Al_2O_3$ conversion.

Similarly to Example 1, the zinc oxide ceramics were compressed and molded into a disk. The temperature of the molded body was raised at a speed of 50° C./hr. Then, the molded body was held for 12 hrs. at a temperature of 950° C. Then, the temperature of the molded body was lowered at a speed of 50° C./hr so that a sintered body was obtained. The sintered body had a thickness of 1.2 mm and a diameter of 14 mm.

In the same manner as in Example 1, the zinc oxide varistor was produced. The electric characteristics of the zinc oxide varistor thus obtained was evaluated similarly to Example 1. Table 23 shows sample compositions, and Table 24 shows the results of the evaluation of the electric characteristics.

TABLE 23

$(Bi_2O_3-TiO_2-Sb_2O_3) + (Bi_2O_3-Cr_2O_3)$ Synthetic fine particles

| Sample No. | ZnO (part by wt) | $Bi_2O_3-TiO_2-Sb_2O_3$ Synthetic fine particles (part by wt) (*) | $Bi_2O_3-Cr_2O_3$ Synthetic fine particles (part by wt) (**) | CoO (part by wt) | $MnO_2$ (part by wt) | $Al_2O_3$ (part by wt) |
|---|---|---|---|---|---|---|
| 341 | 100.0 | 3.9 (97.5) | 0.1 (2.5) | 0.50 | 0.50 | 0.0013 |
| 342 | 100.0 | 3.8 (95.0) | 0.2 (5.0) | 0.50 | 0.50 | 0.0013 |
| 343 | 100.0 | 3.7 (92.5) | 0.3 (7.5) | 0.50 | 0.50 | 0.0013 |
| 344 | 100.0 | 3.6 (90.0) | 0.4 (10.0) | 0.50 | 0.50 | 0.0013 |
| 345 | 100.0 | 3.5 (87.5) | 0.5 (12.5) | 0.50 | 0.50 | 0.0013 |
| 346 | 100.0 | 3.4 (85.5) | 0.6 (15.0) | 0.50 | 0.50 | 0.0013 |
| 347 | 100.0 | 3.3 (82.5) | 0.7 (17.5) | 0.50 | 0.50 | 0.0013 |
| 348 | 100.0 | 3.2 (80.0) | 0.8 (20.0) | 0.50 | 0.50 | 0.0013 |

(*) Heat treatment of a mixture $Bi_2O_3:TiO_2:Sb_2O_3 = 88:9:3$ (weight ratio)
(**) Heat treatment of a mixture $Bi_2O_3:Cr_2O_3 = 93:7$ (weight ratio)

TABLE 24

| Sample No. | $V_{1mA/mm}$ (V) | $_{0.1mA}\alpha_{1mA}$ | Rate of change in DC loading $\Delta V_{1mA}/V_{1mA}(\%)$ | Rate of change in surge $\Delta V_{1mA}/V_{1mA}(\%)$ |
|---|---|---|---|---|
| 341 | 13~22 | 15~20 | -4~+1 | -2~-1 |
| 342 | 20~25 | 18~25 | -3~0 | -4~0 |
| 343 | 22~26 | 20~24 | -2~+2 | -3~0 |
| 344 | 30~38 | 25~35 | -3~0 | -2~+1 |
| 345 | 80~95 | 30~45 | -4~-1 | -3~0 |
| 346 | 95~115 | 40~55 | -3~-1 | -4~0 |
| 347 | 130~145 | 45~52 | -2~+2 | -2~0 |
| 348 | 180~205 | 48~62 | -2~+1 | -3~0 |

When the ratio of bismuth oxide/titanium oxide/antimony oxide synthetic powder (A) to bismuth oxide/chromium oxide (B) is greater than 90:10, i.e., (A) is greater than 90, a zinc oxide varistor for a low voltage can be obtained. The ratio of bismuth oxide/titanium oxide/antimony oxide synthetic powder (A) to bismuth oxide/chromium oxide (B) is less than 87.5:12.5, i.e., (B) is greater than 12.5, a zinc oxide varistor for a high voltage can be obtained. In any case, α values are great, and the absolute value of the rate of change $\Delta V_{1mA}/V_{1mA}$ in threshold voltage $V_{1mA}$ is 5% or less for long-time CD loading and surge, so that excellent reliability can be obtained.

In particular, two kinds of synthetic powder are obtained to produce the ZnO ceramics. Therefore, even if sintering is performed at a low temperature of 750° C., liquid phase reaction can be controlled more effectively. Consequently, a ZnO varistor having ZnO particles which are uniformly grown can be produced.

According to the zinc oxide varistor produced by zinc oxide ceramics of the present invention, the synthetic powder having proper compositions is used so that ZnO particles have the average particle size which is optionally selected within the wide range at a small particle size distribution. More specifically, it is possible to produce the zinc oxide varistor having excellent electric characteristics and reliability in high yield.

The zinc oxide varistor using the ceramics according to the present invention can be sintered at a low temperature of 750° C. so that power consumption can be reduced and a furnace material and a container are seldom wasted. Thus, energy and resources can be saved.

According to the above example, the particles of each synthetic powder pass through the 325-mesh screen. Also in the case where the particle size is greater, i.e., particles pass through a 30-mesh screen, a zinc oxide varistor having good characteristics can be obtained.

EXAMPLE 10

Bismuth oxide powder, titanium oxide powder, antimony oxide (whose particles pass through 200-, 325- and 200-mesh screens respectively), chromium oxide (whose particles pass through the 325-mesh screen), and boron oxide (whose particles pass through the 200-mesh screen) were blended at a weight ratio of 88:8.5:2:1:0.5. The blended powder was heated at a temperature of 500° C. for 1 hr. in the air, and then fine ground by means of the ball mill with the monomalon pot using stabilizing zirconia balls. Consequently, a synthetic power (whose particles pass through the 325-mesh screen) was obtained. The synthetic powder which is prepared from bismuth oxide, titanium oxide, antimony oxide, chromium oxide and boron oxide is called bismuth oxide/titanium oxide/antimony oxide/chromium oxide/boron oxide synthetic powder.

Zinc oxide powder (having an average particle size of 0.3 μm), bismuth oxide/titanium oxide/antimony oxide/chromium oxide/boron oxide synthetic powder, cobalt oxide powder (whose particles pass through the 325-mesh screen), manganese oxide powder (whose particles pass through the 200-mesh screen) were blended a t a weight ratio of 100 0.2 to 20.0:0.954:0.414 while changing the amount of bismuth oxide/titanium oxide/antimony oxide/chromium oxide/boron oxide synthetic powder. The blended powder was mixed and ground for 12 to 18 hrs. with stabilizing zirconia balls and the monomalon pot so as to pass through the 325-mesh screen. The powder was dried, compressed and molded into a disk. The temperature of a molded body thus obtained is raised at a speed of 50° C./hr in the air, held for 2 hrs. at a temperature of 950° C. and cooled at a temperature of 50° C./hr. Consequently, a sintered body was obtained. The sintered body had a thickness of 1.2 mm and a diameter of 14 mm.

As described above, the zinc oxide varistor shown in FIG. 1 was produced.

The electric characteristics of the zinc oxide varistor thus obtained are evaluated. As initial electric characteristics, $V_{1mA}$/mm (a voltage/1 mm thickness between terminals obtained when a current of 1 mA flows) and a nonlinear resistance index $_{0.1mA}\alpha_{1mA}$ (a value obtained by $V_{1mA}$ and $V_{1mA}$) were measured. The reliability for DC loading was evaluated. DC loading of 0.2 W was applied for 500 hrs. in the high-temperature atmosphere of 80° C. and the rate of change $\Delta V_{1mA}/V_{1mA}$ in a varistor threshold voltage $V_{1mA}$ (the rate of change of DC loading) was measured. Further, the reliability for surge was evaluated. A pulse of 8×20 μsec, 0.5 kA was applied twice and the rate of change $\Delta V_{1mA}/V_{1mA}$ in the varistor threshold voltage $V_{1mA}$ (the rate of change in surge) was determined. Table 25 shows the composition of samples, and Table 26 shows the result of the evaluation of the electric characteristics. The values indicative of the results of the evaluation of the electric characteristics are maximum and minimum values in the lot.

TABLE 25

| Sample No. | ZnO (part by weight) | $Bi_2O_3$—$TiO_2$—$Sb_2O_3$—$Cr_2O_3$—$B_2O_3$ Synthetic powder (*) (part by weight) | CoO (part by weight) | $MnO_2$ (part by weight) |
|---|---|---|---|---|
| 401 | 100.0 | 0.2 | 0.954 | 0.414 |
| 402 | 100.0 | 0.5 | 0.954 | 0.414 |
| 403 | 100.0 | 0.7 | 0.954 | 0.414 |
| 404 | 100.0 | 1.0 | 0.954 | 0.414 |
| 405 | 100.0 | 2.0 | 0.954 | 0.414 |
| 406 | 100.0 | 5.0 | 0.954 | 0.414 |
| 407 | 100.0 | 10.0 | 0.954 | 0.414 |
| 408 | 100.0 | 15.0 | 0.954 | 0.414 |
| 409 | 100.0 | 20.0 | 0.954 | 0.414 |

(*) Heat treatment of $Bi_2O_3:TiO_2:Sb_2O_3:Cr_2O_3:B_2O_3 = 88:8.5:2:1:0.5$ (weight ratio)

TABLE 26

| Sample No. | $V_{1mA/mm}$ (V) | $_{0.1mA}\alpha_{1mA}$ | Rate of change in DC loading $\Delta V_{1mA}/V_{1mA}$(%) | Rate of change in surge $\Delta V_{1mA}/V_{1mA}$(%) |
|---|---|---|---|---|
| 401 | 5~10 | 9~15 | −18~−10 | −40~−30 |
| 402 | 18~22 | 16~25 | −4~−1 | −3~0 |
| 403 | 19~23 | 30~34 | 0~+1 | −2~0 |
| 404 | 19~23 | 30~35 | 0~+2 | −3~0 |
| 405 | 20~25 | 32~35 | −1~+1 | −3~+1 |
| 406 | 21~25 | 31~35 | −1~+1 | −3~+1 |
| 407 | 20~24 | 30~34 | −2~0 | −2~+1 |
| 408 | 21~25 | 32~34 | −2~0 | −2~+2 |
| 409 | — | — | — | — |

As is apparent from Tables 25 and 26, the zinc oxide varistor using the zinc oxide ceramics according to the present example had a low threshold voltage and the absolute value of the rate of change $\Delta V_{1mA}/V_{1mA}$ in the threshold voltage $V_{1mA}$ was 5% or less for long-time DC loading and surge so that great reliability could be obtained, except for sample No.401 having 0.2 part by weight of the bismuth oxide/titanium oxide/antimony oxide/chromium oxide/boron oxide synthetic powder. As shown in Table 26, the electric characteristics within lots had small variation.

When the zinc oxide varistor was produced from the ceramics of the present example, the variation in electric characteristic between lots was small similar to the variation in electric characteristic within lots, which is not shown in Table 26. According to an example using conventional compositions which has a standard range of ±7% of $V_{1mA}$ and is not treated by heat, a process capability index was changed from 1.0 to 1.333. As a result, while the yield of the example using conventional compositions which is not treated by heat is 90% the yield is 95% according to the present example. When the amount of $Bi_2O_3/TiO_3/Sb_2O_3$ synthetic powder to be added exceeded 20 parts by weight, samples stuck together so that measurement could not be performed (sample No.409). Accordingly, it is preferred that the amount of the synthetic powder to be added is 0.5 to 20 parts by weight to 100 parts by weight of ZnO powder.

COMPARATIVE EXAMPLE 4

Three kinds of zinc oxide varistors using a sintered body which has the same composition as in Example 1 are produced by conventional ceramics in which the mixed powder of bismuth oxide powder, titanium oxide powder, antimony oxide powder, chromium oxide powder and boron oxide powder is not synthesized.

Zinc oxide powder, bismuth oxide powder, titanium oxide powder, antimony oxide powder, chromium oxide powder, boron oxide powder, cobalt oxide powder and manganese oxide powder were blended at a weight ratio of 100:0.88:0.085:0.02:0.01:0.005:0.954:0.414 (sample No.411), 100:1.76:0.17:0.04:0.02:0.010:0.954:0.414 (sample No.412), and 100:4.4:0.425:0.1:0.05:0.025:0.954:0.414 (sample No.413). The blended powder was mixed and ground by the wet method for 18 hrs. by means of a monomalon pot with stabilizing zirconia balls. In the same manner as in Example 10, a sintered body having a thickness of 1.2 mm and a diameter of 14 mm was obtained so that the zinc oxide varistor was produced. Then, the electric characteristics of the zinc oxide varistor are evaluated. Table 27 shows example compositions, and Table 28 shows the results of evaluation of the electric characteristics.

TABLE 27

| Sample No. | ZnO (part by weight) | $Bi_2O_3$ (part by weight) | $TiO_2$ (part by weight) | $Sb_2O_3$ (part by weight) | $Cr_2O_3$ (part by weight) | $B_2O_3$ (part by weight) | CoO (part by weight) | $MnO_2$ (part by weight) |
|---|---|---|---|---|---|---|---|---|
| 411 | 100.0 | 0.88 | 0.085 | 0.02 | 0.01 | 0.005 | 0.954 | 0.414 |
| 412 | 100.0 | 1.76 | 0.17 | 0.04 | 0.02 | 0.01 | 0.954 | 0.414 |
| 413 | 100.0 | 4.4 | 0.425 | 0.10 | 0.05 | 0.025 | 0.954 | 0.414 |

TABLE 28

| Sample No. | $V_{1mA/mm}$ (V) | $0.1\ mA^\alpha$ $1\ mA$ | Rate of change in DC loading $\Delta V_{1mA}/V_{1mA}$ (%) | Rate of change in surge $\Delta V_{1mA}/V_{1mA}$ (%) |
|---|---|---|---|---|
| 411 | 6~18 | 8~14 | −21~−15 | −50~−35 |
| 412 | 10~21 | 12~18 | −18~−14 | −28~−20 |
| 413 | 12~20 | 12~20 | −21~−14 | −25~−14 |

According to the zinc oxide varistor produced by the ceramics according to the prior art as shown in Tables 27 and 28, $V_{1mA}$ was considerably decreased after DC loading of 0.2 W, and the absolute value of the rate of change in DC loading was 10% or more. The absolute value of the rate of change in surge is 10% or more so that reliability was very poor. As shown in Table 28, the variation within the lots was great.

The variation in electric characteristic between lots of the zinc oxide according to Comparative Example 4 was much greater than the variation in electric characteristic in lots, which is not shown in Table 28. A lot of varistors had $V_{1mA}/_{mm}$ and α values which are smaller than values shown in Table 28. It is proved that a sintering temperature of 950° C. is too low to produce the zinc oxide varistor in the method according to the prior art.

As is apparent from the comparison between Example 10 and Comparative Example 4, the zinc oxide varistor using a low-temperature sintered body according to the present example is superior to the zinc oxide varistor according to the prior art in initial electric characteristics, reliability, and the variation in electric characteristic in and between lots.

EXAMPLE 11

Bismuth oxide powder (whose particles pass through a 200-mesh screen), titanium oxide powder (whose particles pass through a 325-mesh screen), and antimony oxide powder (whose particles pass through the 200-mesh screen) were blended at a weight ratio of 81:9:10. The blended powder was treated at a temperature of 800° C. for 10 mins. in the air. Further, bismuth oxide fine particles (which pass through the 200-mesh screen) and chromium oxide fine powder (whose particles pass through the 325-mesh screen) were blended at a weight ratio of 76:24. The blended material was treated at a temperature of 600° C. for 10 mins. in the air. In addition, bismuth oxide fine particles (which pass through the 200-mesh screen) and boron oxide fine powder (whose particles pass through the 200-mesh screen) were mixed at a weight ratio of 93:7. Then, the blended material was treated at a temperature of 600° C. for 10 mins. in the air. These three products were mixed at a ratio of 3.0:0.3:0.3, and fine ground by the wet method for 18 hrs. by means of a monomalon pot with stabilizing zirconia balls. Consequently, $Bi_2O_3/TiO_2/Sb_2O_3/Cr_2O_3/B_2O_3$) synthetic powder (whose particles pass through the 200-mesh screen) that consists of [(bismiuth oxide/titanium oxide/antimony oxide)+(bismuth oxide/chromium oxide)+(bismuth oxide/boron oxide)] was obtained.

Zinc oxide powder (having an average particle size of 0.3 μm), $Bi_2O_3/TiO_2/Sb_2O_3/Cr_2O_3/B_2O_3$ synthetic powder, cobalt oxide powder (whose particles pass through the 325-mesh screen) and manganese oxide powder (whose particles pass through the 200-mesh screen) were blended at a weight ratio of 100:3.6:0.80:0.40, mixed and ground for 18 hrs. by the wet method by means of the monomalon pot with stabilizing zirconia balls. The powder thus obtained was dried and mixed with an aluminum nitrate solution which contains 0.0013 part by weight of aluminum oxide by $Al_2O_3$ conversion for 100 parts by weight of zinc oxide. Then, a material thus obtained was compressed and molded into a disk. The temperature of the molded body was raised at a speed of 50° C./hr. Then, the molded body was held for 15 hrs. at temperatures of 700° C., 720° C., 800° C., 900° C., 1000° C., 1050° C. 110° C., and 1150° C. Then, the temperatures of the molded body were lowered at a speed of 150° C./hr so that respective sintered bodies were obtained. Each sintered body had a thickness of 1.2 mm and a diameter of 14 mm.

In the same manner as Example 10, the zinc oxide varistor was produced. The electric characteristics of the zinc oxide varistor are evaluated similarly to Example 10. Table 29 shows sample compositions, and Table 30 shows the results of evaluation of the electric characteristics.

TABLE 29

| Sample No. | Sintering temperature (° C.) | ZnO (part by wt) | $Bi_2O_3$—$TiO_2$—$Sb_2O_3$—$Cr_2O_3$—$B_2O_3$ Synthetic fine particles (part by weight) | | | CoO (part by wt) | $MnO_2$ (part by wt) | $Al_2O_3$ (part by wt) |
|---|---|---|---|---|---|---|---|---|
| | | | $Bi_2O_3$—$TiO_2$—$Sb_2O_3$ (*) | $Bi_2O_3$—$Cr_2O_3$ () | $Bi_2O_3$—$B_2O_3$ (*) | | | |
| 501 | 700 | 100 | 3.0 | 0.3 | 0.3 | 0.80 | 0.40 | 0.0013 |
| 502 | 720 | 100 | 3.0 | 0.3 | 0.3 | 0.80 | 0.40 | 0.0013 |
| 503 | 800 | 100 | 3.0 | 0.3 | 0.3 | 0.80 | 0.40 | 0.0013 |
| 504 | 900 | 100 | 3.0 | 0.3 | 0.3 | 0.80 | 0.40 | 0.0013 |
| 505 | 1000 | 100 | 3.0 | 0.3 | 0.3 | 0.80 | 0.40 | 0.0013 |
| 506 | 1050 | 100 | 3.0 | 0.3 | 0.3 | 0.80 | 0.40 | 0.0013 |
| 507 | 1100 | 100 | 3.0 | 0.3 | 0.3 | 0.80 | 0.40 | 0.0013 |
| 508 | 1150 | 100 | 3.0 | 0.3 | 0.3 | 0.80 | 0.40 | 0.0013 |

(*) Heat treatment of a mixture $Bi_2O_3:TiO_2:Sb_2O_3$ = 81:9:10 (weight ratio)
(**) Heat treatment of a mixture $Bi_2O_3:Cr_2O_3$ = 76:24 (weight ratio)
(***) Heat treatment of a mixture $Bi_2O_3:B_2O_3$ = 93:7 (weight ratio)

TABLE 30

| Sample No. | $V_{1mA/mm}$ (V) | 0.1 $mA^\alpha$ 1 mA | Rate of change in DC loading $\Delta V_{1mA}/V_{1mA}$ (%) | Rate of change in surge $\Delta V_{1mA}/V_{1mA}$ (%) |
|---|---|---|---|---|
| 501 | 450~700 | 10~40 | −40~−30 | −45~−10 |
| 502 | 410~430 | 70~75 | −4~−2 | −4~+1 |
| 503 | 320~350 | 60~65 | −3~−1 | −4~0 |
| 504 | 220~230 | 55~60 | −3~−1 | −3~0 |
| 505 | 205~220 | 55~60 | −2~0 | −3~+1 |
| 506 | 200~220 | 54~58 | −3~0 | −3~0 |
| 507 | 195~215 | 54~59 | −3~−1 | −2~+1 |
| 508 | 190~210 | 55~59 | −2~−1 | −3~+1 |

As a result of sintering at a temperature of 720 to 1150° C. which is shown in Tables 29 and 30, the zinc oxide varistor produced from the ceramics according to the present invention had a high threshold voltage and the absolute value of the rate of change $\Delta V_{1mA}/V_{1mA}$ in the threshold voltage $V_{1mA}$ was 5% or less for long-time DC loading and surge so that excellent reliability could be obtained. As shown in Table 30, the variation in electric characteristics within lots was small. The zinc oxide varistor obtained by sintering at a temperature of 1150° C. also has excellent characteristics, but is not preferred because an element body is deformed during sintering or elements stick together so that the yield is lowered.

When the zinc oxide varistor was manufactured from the ceramics of this example, the variation in electric characteristic between lots was small similar to the variation in electric characteristics within lots, which is not shown in Table 30. According to a sample using conventional compositions which has a standard range ±5% of $V_{1mA}$ and is not treated by heat, a process capability index was changed from 1.0 to 1.33. As a result, while the yield of the example using conventional compositions which is not treated by heat is 90%, the yield is increased to 95% according to the present invention.

EXAMPLE 12

Bismuth oxide powder (whose particles pass through a 200-mesh screen), titanium oxide powder (whose particles pass through a 325-mesh screen), and antimony oxide fine powder (whose particles pass through the 200-mesh screen) were blended at a weight ratio of 81:9:10. The blended powder was heated at a temperature of 550° C. for 5 hrs. in the air. Further, bismuth oxide fine particles (which pass through the 200-mesh screen) and chromium oxide fine powder (whose particles pass through the 200-mesh screen) were blended at a weight ratio of 50:50. The blended material was treated at a temperature of 500° C. for 1 hr. in the air. In addition, bismuth oxide fine particles (which pass through the 200-mesh screen) and boron oxide fine powder (whose particles pass through the 200-mesh screen) were blended at a weight ratio of 90:10. Then, the blended material was treated at a temperature of 450° C. for 1 hr. in the air. These three products were blended at a ratio of 4.5:0.4:0.1 (sample No.601), 4.5:0.25 0.25 (sample No.602), 4.5:0.1:0.4 (sample No.603), 4.4:0.4:0.2 (sample No.604), 4.4:0.3:0.3 (sample No.605), 4.4 0.2:0.4 (sample No.606), 4.3:0.55:0.15 (sample 607), and 4.3:0.35:0.35 (sample No.608), and mixed and fine ground by the wet method for 18 hrs. by means of the monomalon pot with stabilizing zirconia balls. As a result, $Bi_2O_3/TiO_2/Sb_2O_3/Cr_2O_3/B_2O_3$) synthetic powders (whose particles pass through the 200-mesh screen) that include 8 kinds of [(bismuth oxide/titanium oxide/antimony oxide)+(bismuth oxide/chromium oxide)+(bismuth oxide/boron oxide)] are obtained.

Zinc oxide powder (having an average particle size of 0.3 $\mu$m), $Bi_2O_3$ /$TiO_2$/$Sb_2O_3$/$Cr_2O_3$/$B_2O_3$ synthetic powder which includes (bismuth oxide/titanium oxide/antimony oxide synthetic powder)+(bismuth oxide/chromium oxide synthetic powder)+(bismuth oxide/boron oxide), cobalt oxide powder (whose particles pass through the 325-mesh screen), and manganese oxide powder (whose particles pass through the 200-mesh screen) were blended at a weight ratio of 100:5.0:0.50:0.50, mixed and ground for 18 hrs. by the wet method by means of the monomalon pot with stabilizing zirconia balls. The powder thus obtained was dried and mixed with an aluminum nitrate solution which contains 0.0020 part by weight of aluminum oxide by $Al_2O_3$ conversion. Then, a material thus obtained was compressed and molded into a disk. The temperature of the molded body was raised at a speed of 100° C./hr. in the air. Then, the molded body was held for 1 hr. at a temperature of 1000° C. Thereafter, the temperature of the molded body was lowered at a speed of 100° C./hr so that a sintered body was obtained. The sintered body had a thickness of 1.2 mm and a diameter of 14 mm.

In the same manner as Example 10, the zinc oxide varistor was produced. The electric characteristics of the zinc oxide varistor are evaluated similarly to Example 10. Table 31 shows sample compositions, and Table 32 shows the results of the evaluation of the electric characteristics.

TABLE 31

| | | $Bi_2O_3$—$TiO_2$—$Sb_2O_3$—$Cr_2O_3$—$B_2O_3$ Synthetic fine particles (part by weight) | | | | | |
|---|---|---|---|---|---|---|---|
| Sample No. | ZnO (part by wt) | $Bi_2O_3$—$TiO_2$—$Sb_2O_3$ (*) | $Bi_2O_3$—$Cr_2O_3$ () | $Bi_2O_3$—$B_2O_3$ (*) | CoO (part by wt) | $MnO_2$ (part by wt) | $Al_2O_3$ (part by wt) |
| 601 | 100 | 4.5 | 0.40 | 0.10 | 0.50 | 0.50 | 0.0020 |
| 602 | 100 | 4.5 | 0.25 | 0.25 | 0.50 | 0.50 | 0.0020 |
| 603 | 100 | 4.5 | 0.10 | 0.40 | 0.50 | 0.50 | 0.0020 |
| 604 | 100 | 4.4 | 0.40 | 0.20 | 0.50 | 0.50 | 0.0020 |
| 605 | 100 | 4.4 | 0.30 | 0.30 | 0.50 | 0.50 | 0.0020 |
| 606 | 100 | 4.4 | 0.20 | 0.40 | 0.50 | 0.50 | 0.0020 |
| 607 | 100 | 4.3 | 0.55 | 0.15 | 0.50 | 0.50 | 0.0020 |
| 608 | 100 | 4.3 | 0.35 | 0.35 | 0.50 | 0.50 | 0.0020 |

(*) Heat treatment of a mixture $Bi_2O_3$:$TiO_2$:$Sb_2O_3$ = 81:9:10 (weight ratio)
(**) Heat treatment of a mixture $Bi_2O_3$:$Cr_2O_3$ = 50:50 (weight ratio)
(***) Heat treatment of a mixture $Bi_2O_3$:$B_2O_3$ = 90:10 (weight ratio)

TABLE 32

| Sample No. | $V_{1mA/mm}$ (V) | 0.1 mA$^\alpha$ 1 mA | Rate of change in DC loading $\Delta V_{1mA}/V_{1mA}$ (%) | Rate of change in surge $\Delta V_{1mA}/V_{1mA}$ (%) |
|---|---|---|---|---|
| 601 | 15~21 | 11~16 | −5~+1 | −5~−1 |
| 602 | 23~26 | 18~23 | −3~0 | −4~0 |
| 603 | 24~28 | 21~24 | −2~+2 | −3~0 |
| 604 | 30~38 | 25~35 | −3~0 | −2~+1 |
| 605 | 84~95 | 30~45 | −4~−1 | −3~0 |
| 606 | 101~110 | 42~50 | −2~+2 | −4~0 |
| 607 | 130~145 | 45~53 | −2~−1 | −2~0 |
| 608 | 180~200 | 50~62 | −2~−1 | −3~0 |

As is apparent from Tables 31 and 32, for the zinc oxide varistor using the ceramics according to the present example, when the mixing ratio of (bismuth oxide/titanium oxide/antimony oxide), (bismuth oxide/chromium oxide) and (bismuth oxide/boron oxide) of bismuth oxide/titanium oxide/antimony oxide/chromium oxide/boron oxide synthetic powder is changed, a threshold voltage can be changed greatly. More specifically, zinc oxide varistors for low and high voltages can be obtained. In any case, the $\alpha$ value was great and the absolute value of the rate of change $\Delta V_{1mA}/V_{1mA}$ in the threshold voltage $V_{1mA}$ is 5% or less for long-time DC loading and surge.

The invention may be embodied in other forms without departing from the spirit or essential characteristics thereof.

The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A zinc oxide ceramic comprising a sintered mixture of a first component, a second component and a third component that comprises:

100 parts by weight of zinc oxide as the first component:

0.1 to 5.0 parts by weight of at least one of cobalt oxide and manganese oxide as the second component; and 0.2 to 20 parts by weight of a powder mixture of the oxides of bismuth, titanium and antimony as the third component;

wherein the third component is heated at temperatures of 450° C. to 800° C. before a mixture of the first, second and third components is formed, and wherein the ceramic is suitable for use with an Ag electrode.

2. The zinc oxide ceramic according to claim 1, wherein the third component further comprises at least one selected from boron oxide and boric acid.

3. The zinc oxide ceramic according to claim 1, wherein the third component further comprises chromium oxide.

4. The zinc oxide ceramic according to claim 1, wherein the amount of bismuth oxide is 0.3 to 10.0 parts by weight for 100 parts by weight of zinc oxide by $Bi_2O_3$ conversion.

5. The zinc oxide ceramic according to claim 1, wherein the amount of titanium oxide is 0.1 to 5.0 parts by weight for 100 parts by weight of zinc oxide by $TiO_2$ conversion.

6. The zinc oxide ceramic according to claim 1, wherein the amount of antimony oxide is 0.02 to 2.5 parts by weight for 100 parts by weight of zinc oxide by $Sb_2O_3$ conversion.

7. The zinc oxide ceramic according to claim 2, wherein the boron oxide is boron trioxide.

8. The zinc oxide ceramic according to claim 1, wherein the first component contains 0.00062 to 0.372 part by weight of an aluminum component for 100 parts by weight of zinc oxide by $Al_2O_3$ conversion.

9. The zinc oxide ceramic according to claim 1, wherein the third component comprises a synthetic powder prepared by heat treating a mixture of bismuth oxide and boron oxide that is added to a synthetic powder prepared by heat-treating a mixed powder of at least bismuth oxide, titanium oxide and antimony oxide.

10. The zinc oxide ceramic according to claim 1, wherein the third component comprises a synthetic powder prepared by heat treating a mixture of bismuth oxide and chromium oxide that is added to a synthetic powder prepared by heating treating a mixed powder of at least bismuth oxide, titanium oxide and antimony oxide.

11. The zinc oxide ceramic according to claim 1, wherein the third component comprises a synthetic powder prepared by heat treating a mixture of bismuth oxide and chromium oxide and a synthetic powder prepared by heat-treating a mixture of bismuth oxide and boron oxide that are added to a synthetic powder prepared by heat treating a mixed powder of at least titanium oxide and antimony oxide.

12. A zinc oxide varistor, comprising a zinc oxide ceramic according to claim 1 and an Ag electrode.

13. A zinc oxide ceramic comprising a sintered mixture of a first component, a second component and a third component that comprises:

100 parts by weight of zinc oxide as the first component;

0.1 to 5.0 parts by weight of at least one of cobalt oxide and manganese oxide as the second component; and 0.5 to 20 parts by weight of a powder mixture of the oxides of bismuth, titanium, antimony, and chromium, and at least one of boron oxide and boric acid, as the third component;

wherein the third component is heated at temperatures of 450° C. to 800° C. before a mixture of the first, second and third components is formed, and wherein the ceramic is suitable for use with an Ag electrode.

14. The zinc oxide ceramic according to claim 13, wherein the average particle size of the third component is 0.05 to 10 μm.

15. The zinc oxide ceramic according to claim 13, wherein the manganese oxide is at least one of $MnO$, $Mn_2O_3$ and $MnO_2$.

16. The zinc oxide ceramic according to claim 13, wherein the cobalt oxide is at least one of $CoO$ and $Co_3O_4$.

17. The zinc oxide ceramic according to claim 13, wherein the amount of bismuth oxide is 0.3 to 18.0 parts by weight for 100 parts by weight of zinc oxide by $Bi_2O_3$ conversion.

18. The zinc oxide ceramic according to claim 13, wherein the amount of titanium oxide is 0.03 to 2.00 parts by weight for 100 parts by weight of zinc oxide by $TiO_2$ conversion.

19. The zinc oxide ceramic according to claim 13, wherein the amount of antimony oxide is 0.005 to 1.000 part by weight for 100 parts by weight of zinc oxide by $Sb_2O_3$ conversion.

20. The zinc oxide ceramic according to claim 13, wherein the amount of chromium oxide is 0.005 to 0.500 part by weight for 100 parts by weight of zinc oxide by $Cr_2O_3$ conversion.

21. The zinc oxide ceramic according to claim 13, wherein the amount of boron oxide is 0.002 to 1.000 part by weight for 100 parts by weight of zinc oxide by $B_2O_3$ conversion.

22. The zinc oxide ceramic according to claim 13, wherein the boron oxide is $B_2O_3$.

23. The zinc oxide ceramic according to claim 13, wherein the first component comprises 0.00062 to 0.37200 part by weight of an aluminum oxide for 100 parts by weight of zinc oxide by $Al_2O_3$ conversion.

24. A zinc oxide varistor, comprising a zinc oxide ceramic according to claim 13 and an Ag electrode.

* * * * *